United States Patent
Onnerud et al.

(10) Patent No.: US 12,148,958 B2
(45) Date of Patent: Nov. 19, 2024

(54) SYSTEM AND METHOD FOR ELECTROLYTE FILLING AND ELECTRICAL CONNECTION OF LITHIUM ION BATTERIES

(71) Applicant: Cadenza Innovation, Inc., Wilton, CT (US)

(72) Inventors: Tord Per Jens Onnerud, Wilton, CT (US); Michael Suba, Sandy Hook, CT (US); Jay Jie Shi, Acton, MA (US)

(73) Assignee: Cadenza Innovation, Inc., Wilton, CT (US)

( * ) Notice: Subject to any disclaimer, the term of this patent is extended or adjusted under 35 U.S.C. 154(b) by 701 days.

(21) Appl. No.: 17/282,021

(22) PCT Filed: Oct. 4, 2019

(86) PCT No.: PCT/US2019/054685
§ 371 (c)(1),
(2) Date: Apr. 1, 2021

(87) PCT Pub. No.: WO2020/072897
PCT Pub. Date: Apr. 9, 2020

(65) Prior Publication Data
US 2021/0344090 A1 Nov. 4, 2021

Related U.S. Application Data

(60) Provisional application No. 62/742,022, filed on Oct. 5, 2018.

(51) Int. Cl.
*H01M 50/618* (2021.01)
*H01M 10/04* (2006.01)
(Continued)

(52) U.S. Cl.
CPC ..... *H01M 50/618* (2021.01); *H01M 10/0409* (2013.01); *H01M 10/0525* (2013.01); *H01M 10/0587* (2013.01); *H01M 50/673* (2021.01)

(58) Field of Classification Search
CPC ............. H01M 50/618; H01M 50/673; H01M 10/0409; H01M 10/0525; H01M 10/0587
(Continued)

(56) References Cited

U.S. PATENT DOCUMENTS

| | | |
|---|---|---|
| 2007/0117011 A1 | 5/2007 | Myerberg et al. |
| 2009/0178728 A1 | 7/2009 | Cochran et al. |

(Continued)

FOREIGN PATENT DOCUMENTS

| | | |
|---|---|---|
| CN | 101682021 A | 3/2010 |
| CN | 102034956 A | 4/2011 |

(Continued)

OTHER PUBLICATIONS

English Translation of Chinese Patent Office dated Jan. 19, 2023 for Chinese Patent Application No. 2019800800385.
(Continued)

Primary Examiner — James M Erwin
(74) Attorney, Agent, or Firm — McCarter & English, LLP

(57) ABSTRACT

The present disclosure provides for advantageous electrolyte filling systems/methods utilizing predetermined pressure/flow cycles. The disclosed electrolyte filling system enables filling of at least one jelly roll assembly under vacuum. The disclosed electrolyte filling system is capable of simultaneously filling at least two multi-core lithium ion batteries. The disclosed multi-core lithium ion batteries include a plurality of jelly roll assemblies positioned within cavities, which are further positioned within a sealed enclosure. The disclosed jelly roll assemblies are electrically connected to at least one (Continued)

bus bar. The disclosed bus bars include at least one flexible connective structure to electrically connect to a sealed enclosure.

11 Claims, 15 Drawing Sheets

(51) Int. Cl.
*H01M 10/0525* (2010.01)
*H01M 10/0587* (2010.01)
*H01M 50/673* (2021.01)

(58) Field of Classification Search
USPC .......................................................... 429/159
See application file for complete search history.

(56) References Cited

U.S. PATENT DOCUMENTS

| | | |
|---|---|---|
| 2009/0242073 A1 | 10/2009 | Reschke |
| 2014/0004399 A1 | 1/2014 | Kim et al. |
| 2015/0072261 A1 | 3/2015 | Mench et al. |
| 2015/0145482 A1 | 5/2015 | Hurng et al. |
| 2015/0270530 A1 | 9/2015 | Thoennessen et al. |
| 2015/0280185 A1 | 10/2015 | Lampe-Onnerud et al. |
| 2017/0077487 A1* | 3/2017 | Coakley .............. H01M 50/581 |
| 2017/0098869 A1 | 4/2017 | Wang et al. |

FOREIGN PATENT DOCUMENTS

| | | | |
|---|---|---|---|
| CN | 102569717 A | 7/2012 | |
| CN | 104704650 A | 6/2015 | |
| CN | 204905350 U | 12/2015 | |
| CN | 105406021 A | 3/2016 | |
| CN | 108321329 A | 7/2018 | |
| EP | 2479329 A1 * | 7/2012 | .......... D04H 1/4218 |
| JP | H1126331 A | 1/1999 | |
| KR | 10-2011-0032848 A | 3/2011 | |

OTHER PUBLICATIONS

PCT/US2019/054685, Oct. 4, 2019, WO 2020072897.
U.S. Appl. No. 62/742,022, filed Oct. 5, 2018.
International Search Report and Written Opinion from International Application No. PCT/US2019/054685 Issued Feb. 11, 2020.
JensenGlobal, All-Metal Dispensing Tips, https://jensenglobal.com/products/all-metal-dispensing-tips, 2021.
European Patent Office Communication with Partial Supplementary European Search Report dated Jun. 8, 2022 for European Patent Application No. 19868898.8.

* cited by examiner

FIG. 5A  FIG. 5B

SYSTEM AND METHOD FOR ELECTROLYTE FILLING AND ELECTRICAL CONNECTION OF LITHIUM ION BATTERIES

CROSS-REFERENCE TO RELATED APPLICATION

The present application is a 35 U.S.C. § 371 National Stage filing of International Application No. PCT/US2019/054685, filed on Oct. 4, 2019, which application claims priority benefit to a US provisional patent application entitled "System and Method for Electrolyte and Electrical Connection of Lithium Ion Batteries," which was filed on Oct. 5, 2018 and assigned Ser. No. 62/742,022. The entire content of the foregoing PCT application and US provisional patent application is incorporated herein by reference.

FIELD OF DISCLOSURE

This disclosure relates to lithium ion batteries and, more particularly, to multi-core lithium ion batteries having improved safety and reduced manufacturing costs.

BACKGROUND

In certain instances, traditional lithium ion cells are filled individually prior to insertion into the lithium ion container. In the event of electrolyte spillage during filling, the lithium ion cells can be wiped clean. Accordingly, concerns over residual electrolyte on the lithium ion cells may be reduced. However, where lithium ion cells are filled with electrolyte post-installation into the lithium ion container, electrolyte spillage is a major concern for both safety and reliability. Furthermore, traditional electrolyte filling techniques requires filling the Li-ion cells with a predetermined quantity of electrolyte, following by applying vacuum and then positive pressure. The vacuum and pressure application may be repeated several times.

As a further aspect of lithium ion battery assembly, it is generally necessary to electrically connect the positive and negative terminals relative to the positive/negative connections associated with the individual lithium ion cells. In such instances, a bus bar and/or plate may be used to electrically connect the positive/negative poles of individual cells to each other. Once so connected, electrical connection between the bus bar and/or plate with the positive/negative terminals may pose challenges, e.g., based on available space and a need to electrically isolate one or both connections from each other and/or the outer container.

Based on the foregoing, a need exists for systems and methods for efficiently and controllably delivering electrolyte to lithium ion cells after positioning of the cells within a container. A need also exists for systems/methods and connective elements for electrical connecting battery terminals with bus bars/plates within lithium ion battery assemblies. These and other inefficiencies and opportunities for improvement are addressed and/or overcome by the assemblies, systems and methods of the present disclosure.

SUMMARY

Advantageous electrolyte filling assemblies, disclosed herein, facilitate the filling of at least one lithium ion member (i.e., jelly roll assembly). More particularly, in various exemplary embodiments, the disclosed filling assemblies may fill a plurality of jelly roll assemblies, which may be housed within a multi-core lithium ion battery. In yet another exemplary embodiment, the disclosed filling assemblies may fill a plurality of multi-core lithium ion batteries simultaneously, which house a plurality of jelly roll assemblies.

The present disclosure further includes at least one improved enclosure for sealing at least one jelly roll assembly. The at least one jelly roll assembly may be positioned within a support member. The support member may be positioned within a can and sealed with a cover (collectively referred to as an "enclosure"), thereby producing a sealed multi-core lithium ion battery.

Still further, the present disclosure provides effective connective structure(s) for electrically connecting the positive and/or negative terminals of a lithium ion battery assembly with a bus bar and/or plate that is in electrical communication with a plurality of lithium ion cells. The connective structure(s) may advantageously take the form of an electrically conductive braid, an electrically conductive, multi-layer flexible sheet or a combination thereof.

Additional features, functions and benefits of the present disclosure will be apparent from the detailed description which follows, particularly when read in conjunction with the accompanying figures.

BRIEF DESCRIPTION OF THE FIGURES

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1A:
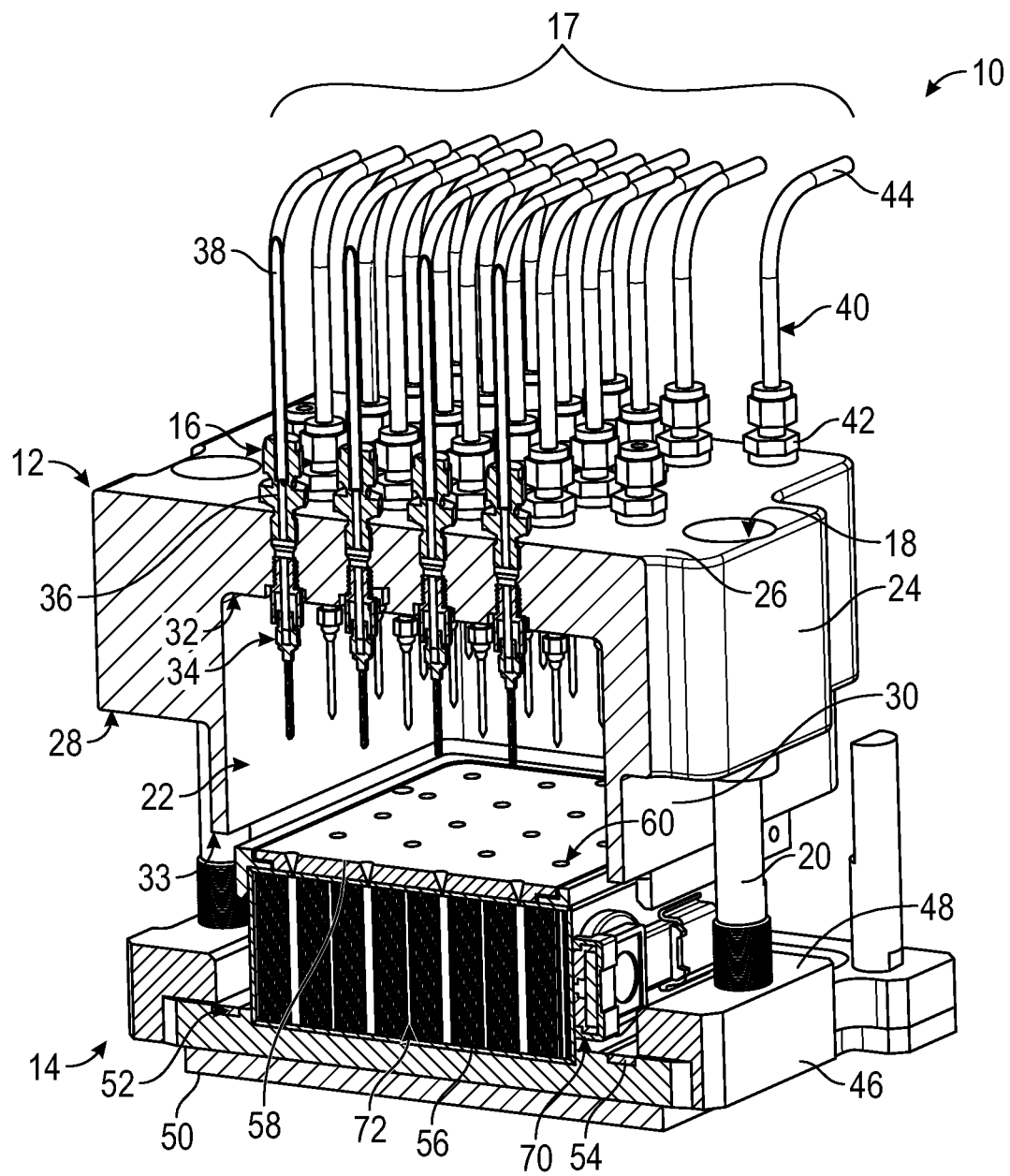
Figure 1B:
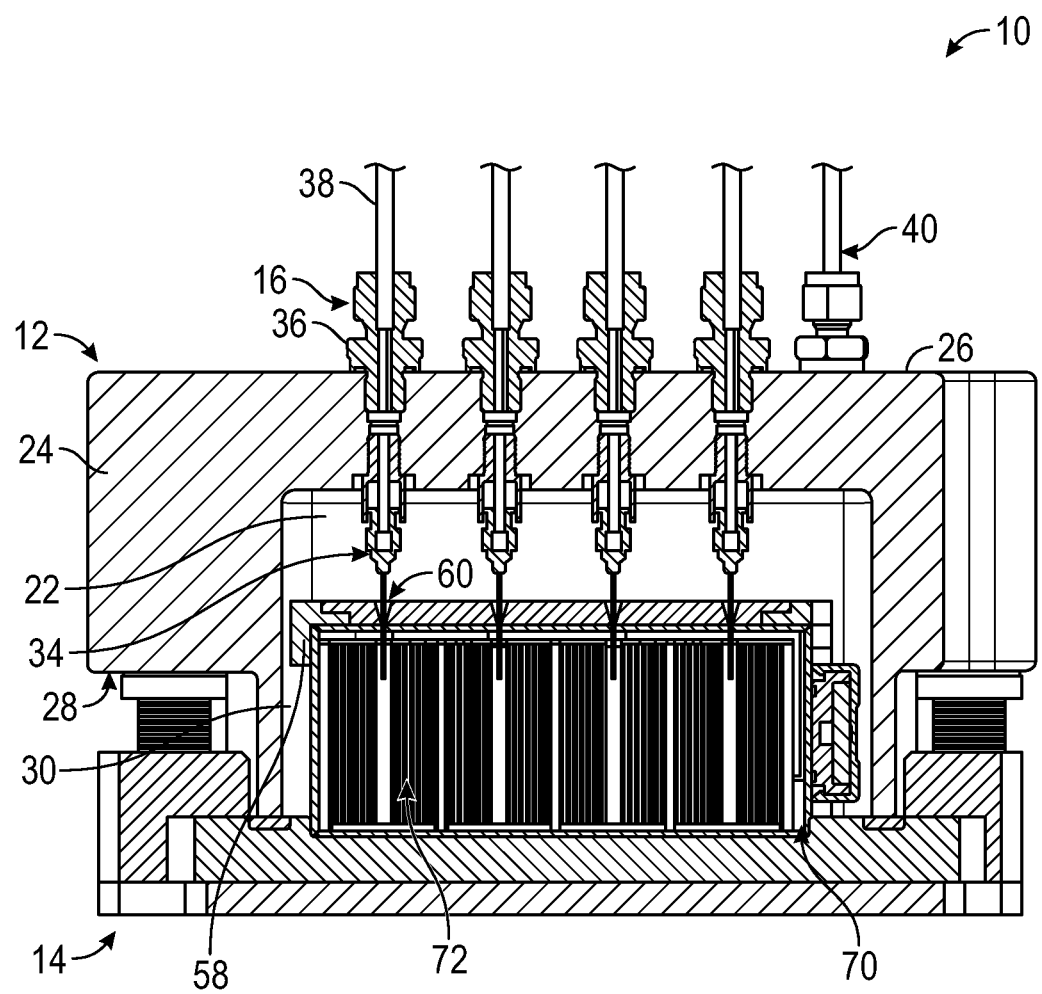
Figure 2A:
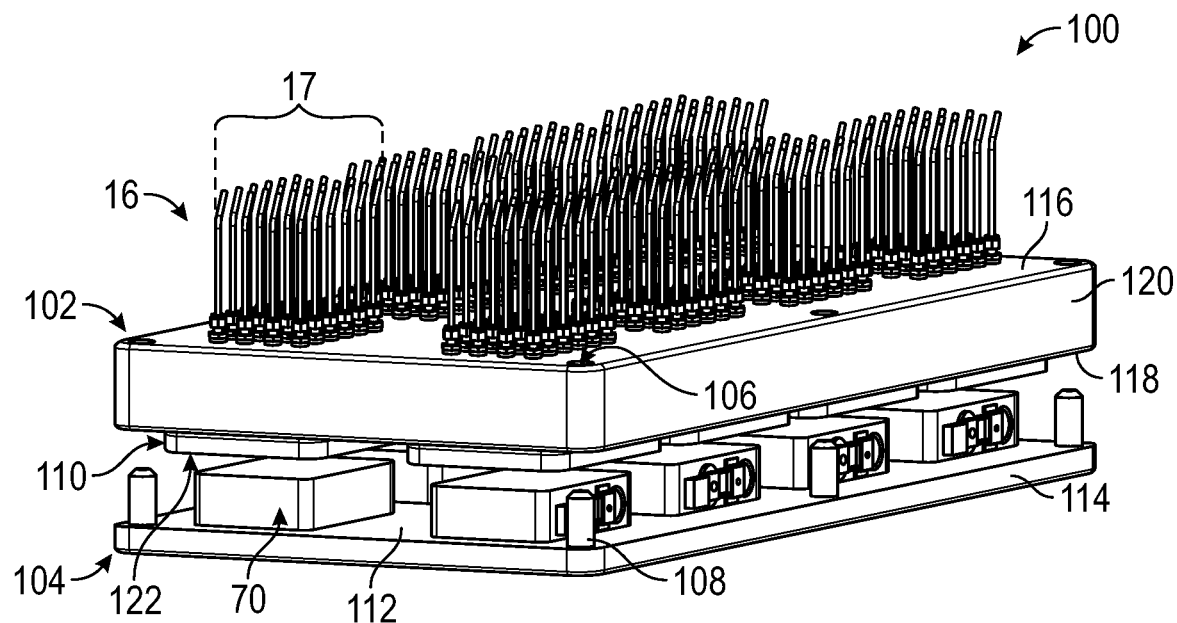
Figure 2B:
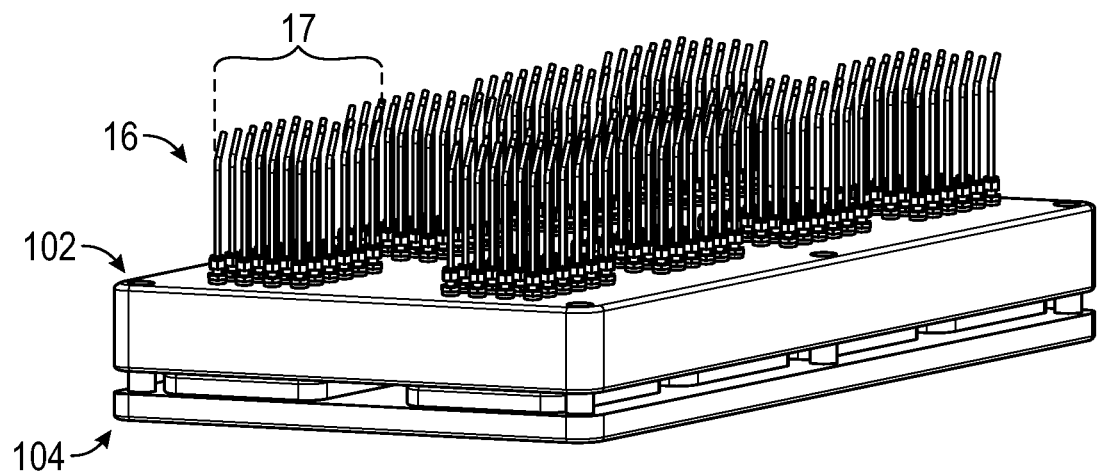
Figure 3:
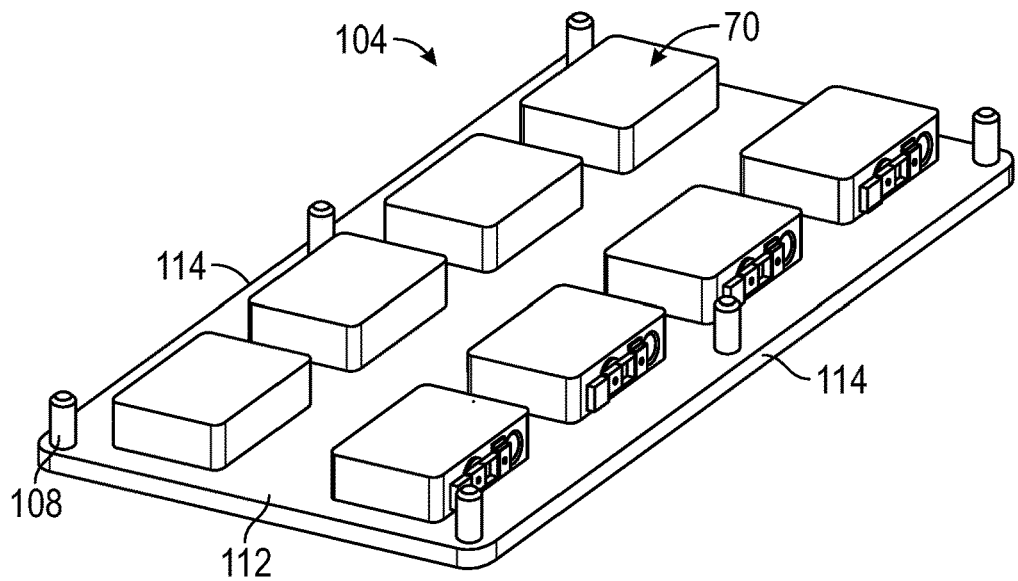
Figure 4:
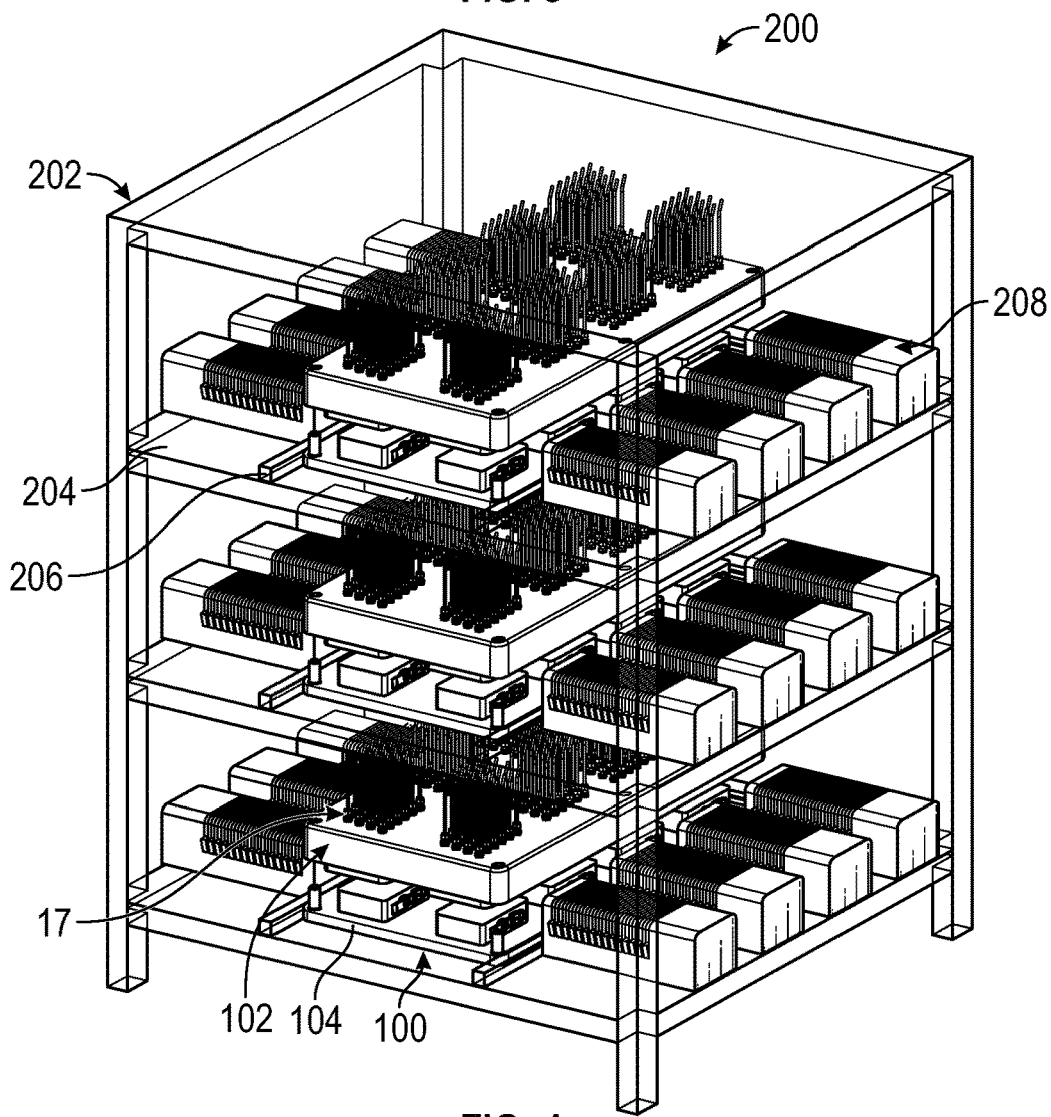
Figure 5C:
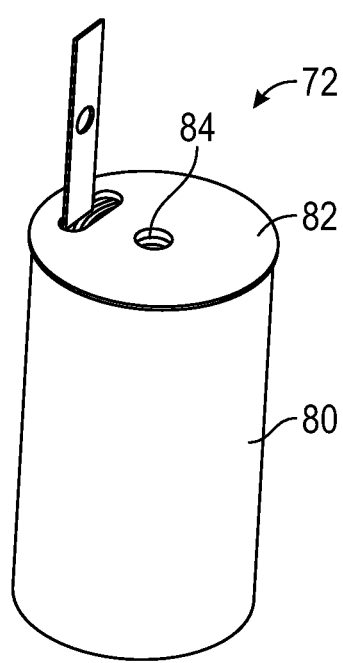
Figure 5C:
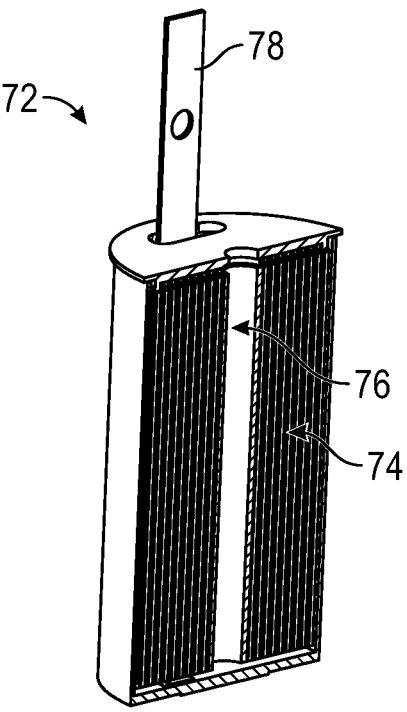
Figure 5C:
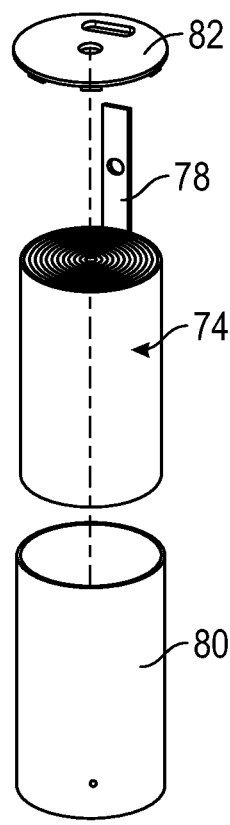
Figure 6:
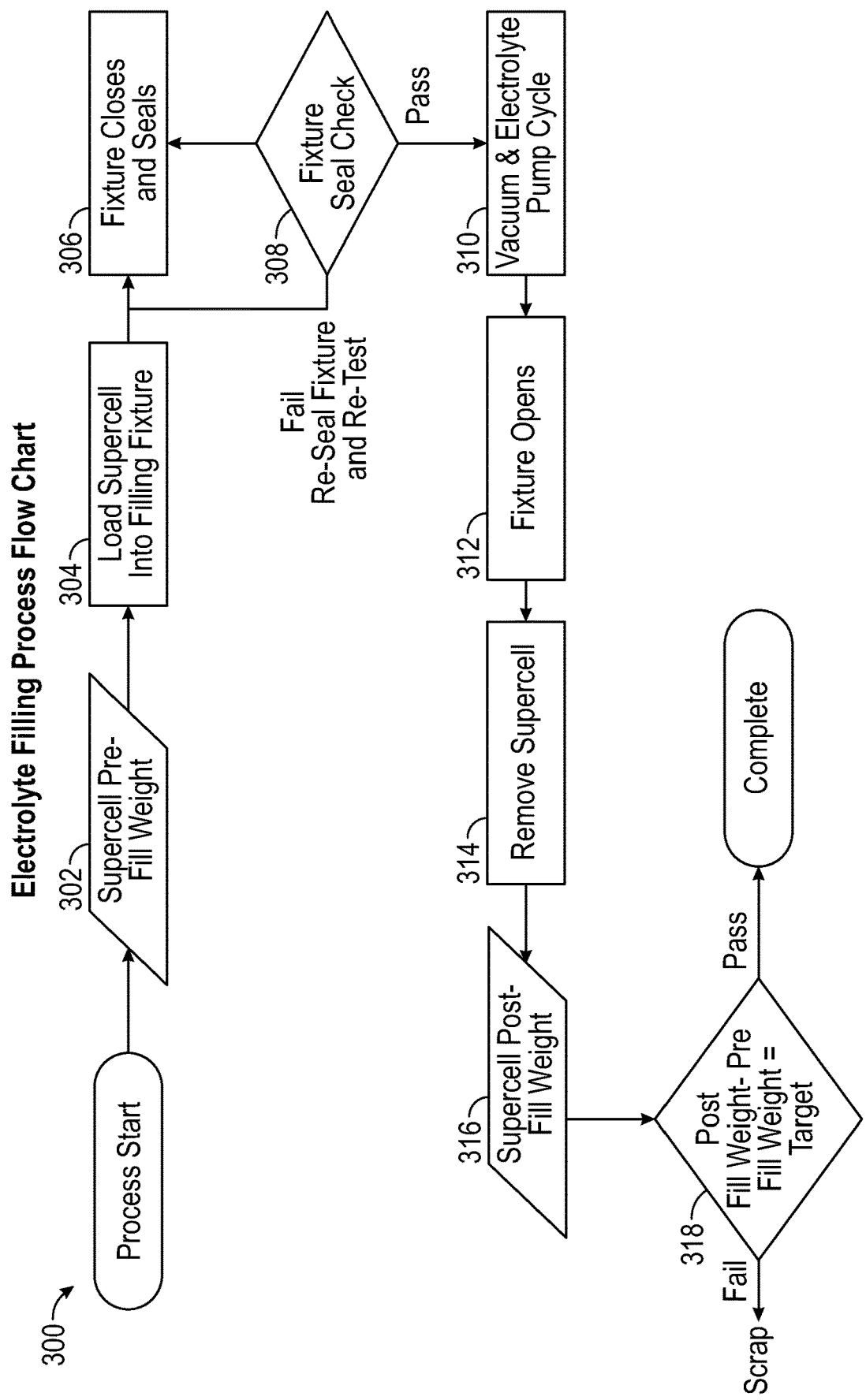
Figure 7:
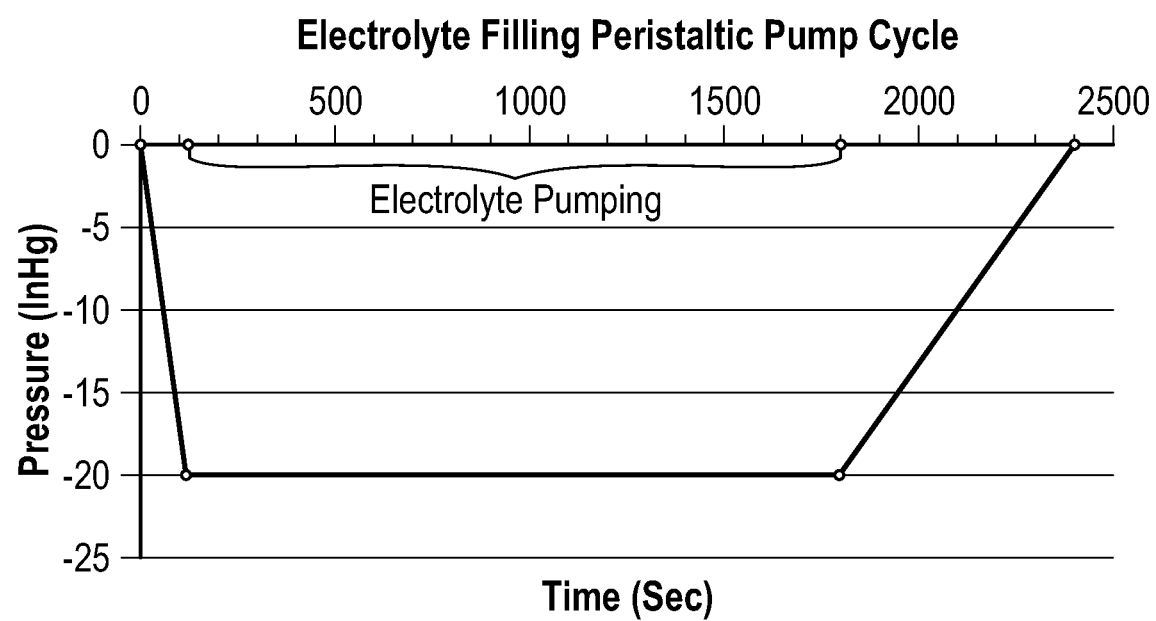
Figure 8A:
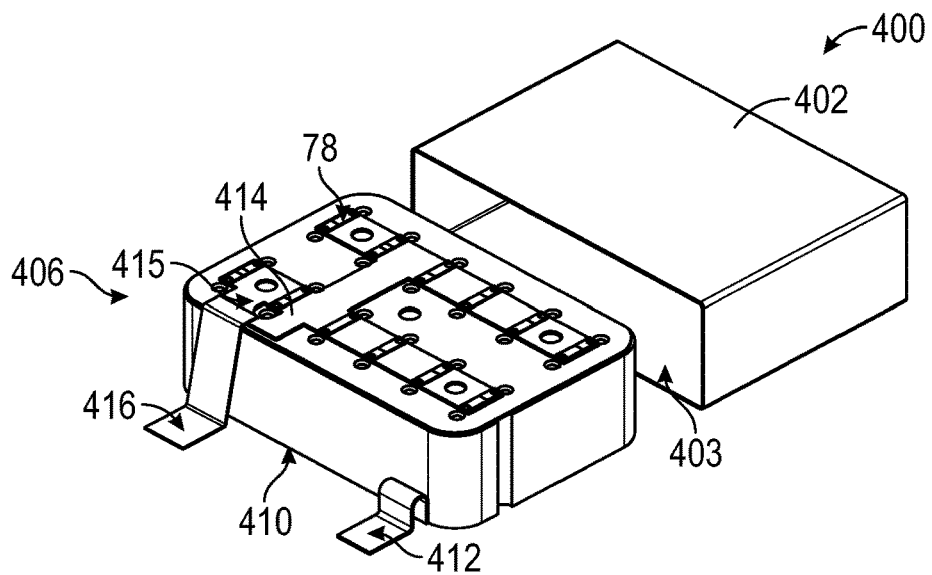
Figure 8B:
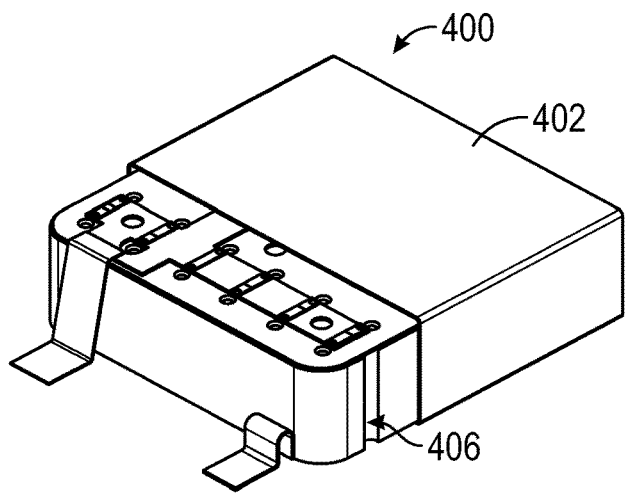
Figure 8C:
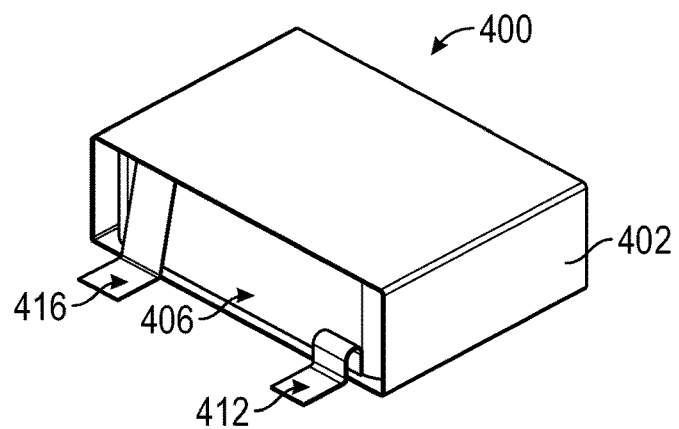
Figure 9A:
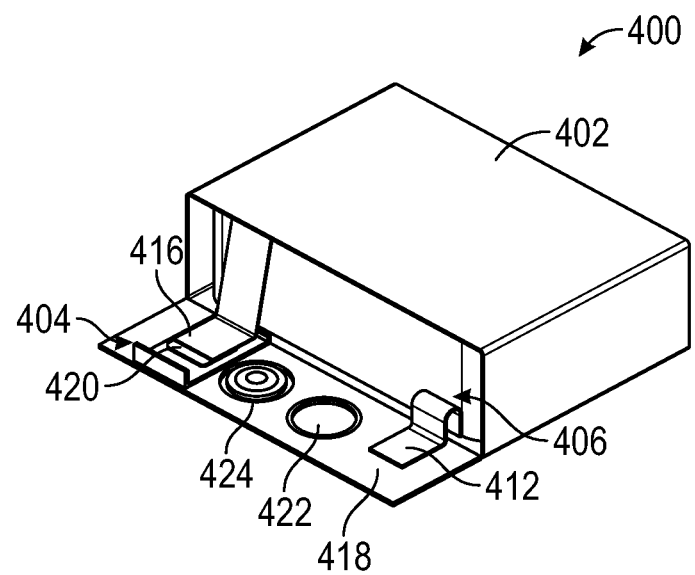
Figure 9B:
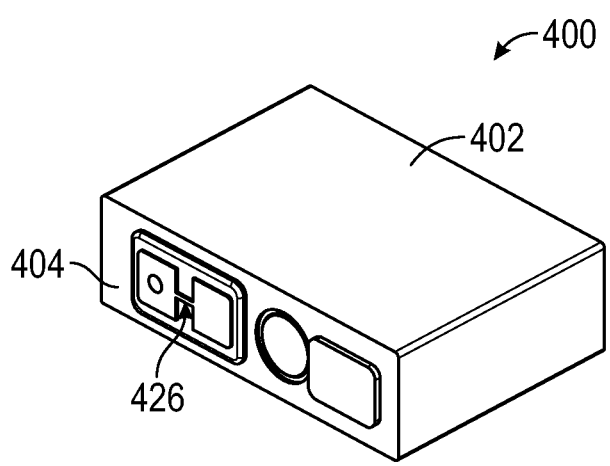
Figure 10:
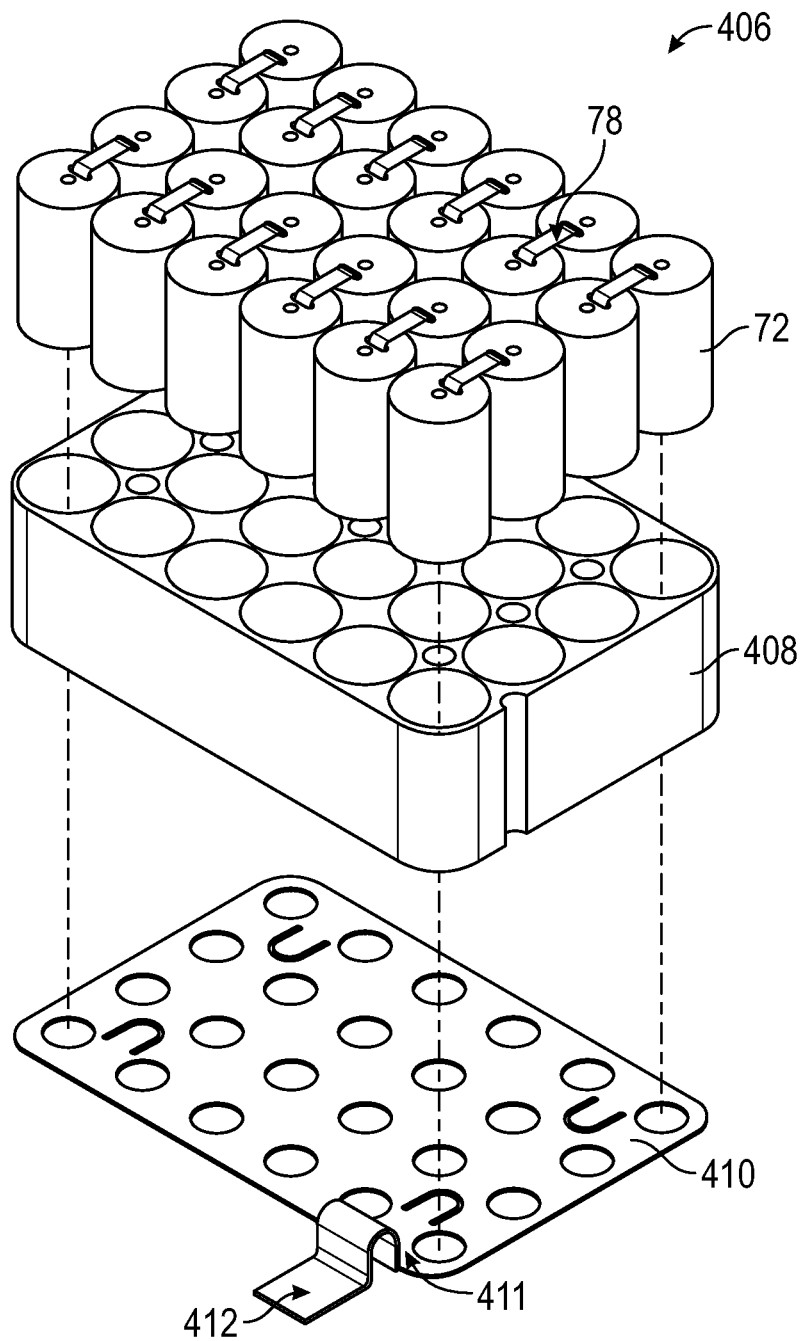
Figure 11:
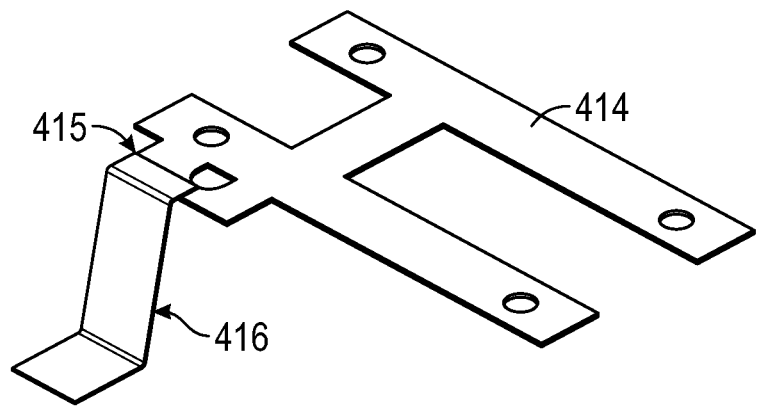
Figure 12:
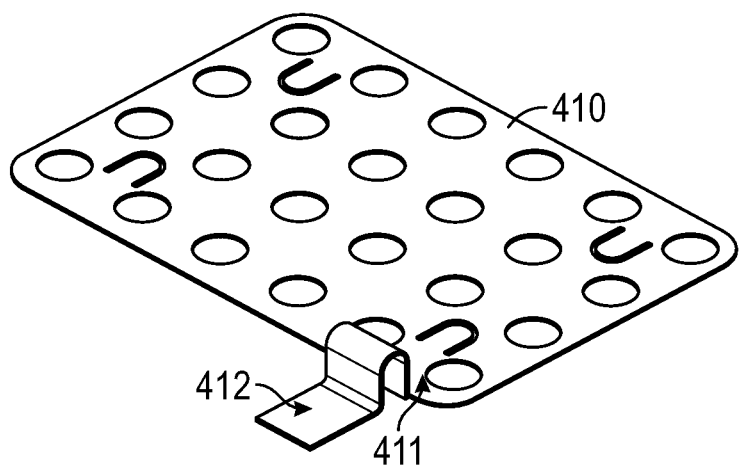

To assist those of ordinary skill in the art in making and using the disclosed assemblies, systems and methods, reference is made to the appended figures, wherein:

FIG. 1A schematically depicts a perspective view of an exemplary electrolyte filling assembly in the open position, according to the present disclosure;

FIG. 1B schematically depicts a front view of an exemplary electrolyte filling assembly in the closed position, according to the present disclosure;

FIG. 2A schematically depicts a perspective view of an exemplary electrolyte filling assembly in the open position, according to the present disclosure;

FIG. 2B schematically depicts a perspective view of an exemplary electrolyte filling assembly in the closed position, according to the present disclosure;

FIG. 3 schematically depicts a perspective view of an exemplary electrolyte filling assembly base, according to the present disclosure;

FIG. 4 schematically depicts a perspective view of an exemplary electrolyte filling assembly rack, according to the present disclosure;

FIG. 5A schematically depicts a perspective view of an exemplary jelly roll assembly, according to the present disclosure;

FIG. 5B schematically depicts a cross-sectional view of an exemplary jelly roll assembly, according to the present disclosure;

FIG. 5C schematically depicts an exploded view of an exemplary jelly roll assembly, according to the present disclosure;

FIG. 6 schematically depicts a flow chart of an exemplary electrolyte filling process, according to the present disclosure;

FIG. 7 schematically depicts a chart of an exemplary electrolyte filling process, according to the present disclosure;

FIGS. 8A-8C schematically depict a partially assembled perspective view of an exemplary multi-core lithium ion battery, according to the present disclosure;

FIGS. 9A-9B schematically depict an assembled perspective view of an exemplary multi-core lithium ion battery, according to the present disclosure;

FIG. 10 schematically depicts an exploded view of an exemplary support member assembly, according to the present disclosure;

FIG. 11 schematically depicts a perspective view of an exemplary bus bar, according to the present disclosure;

FIG. 12 schematically depicts a perspective view of an exemplary bus bar, according to the present disclosure.

Figure 13:
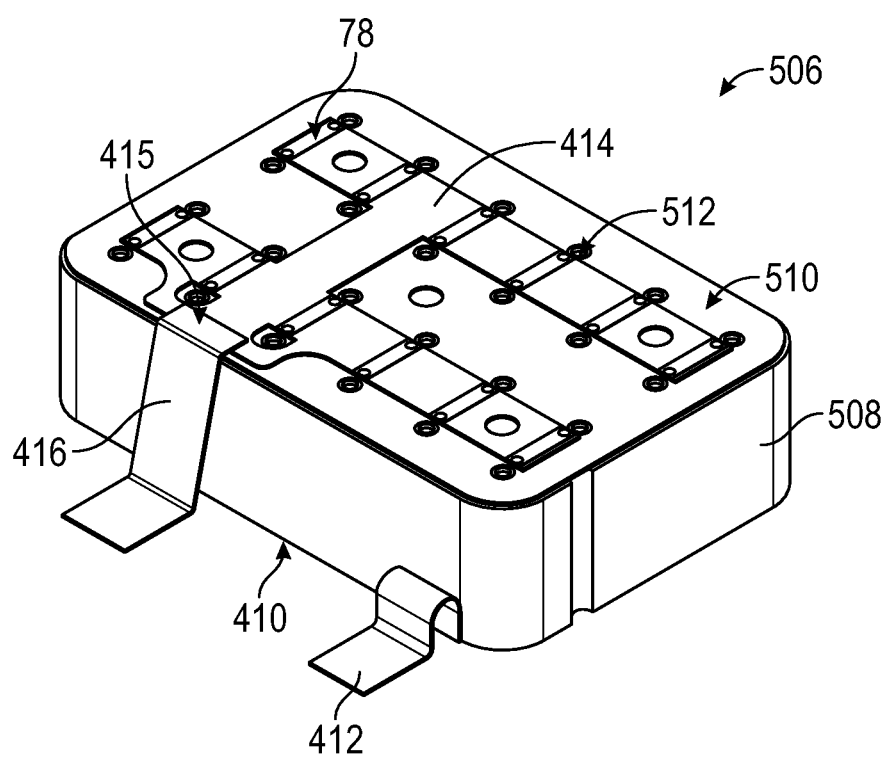
Figure 14:
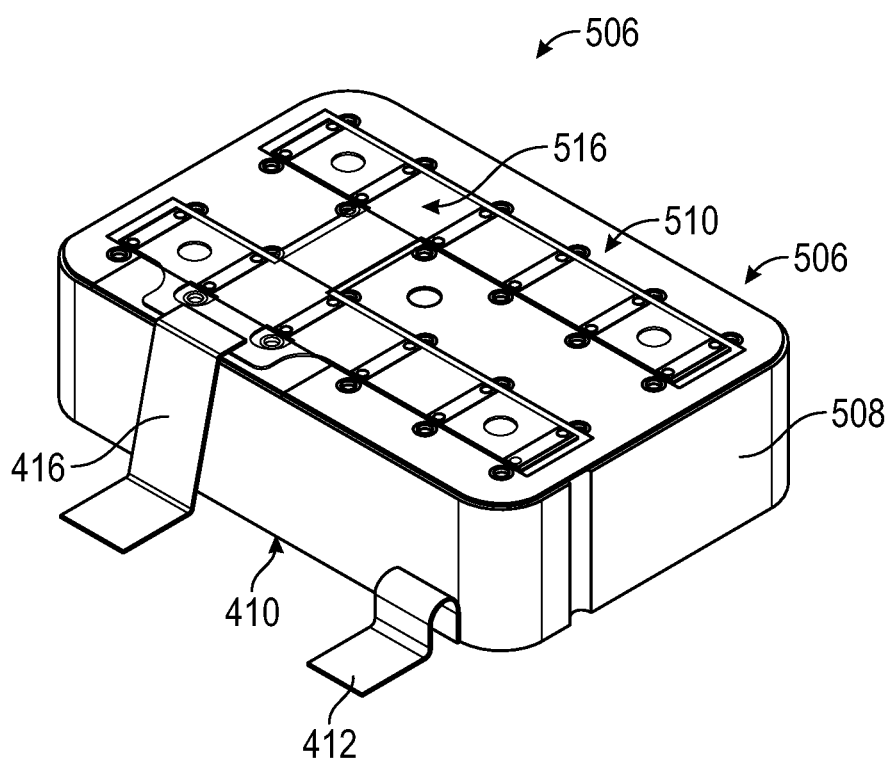
Figure 15:
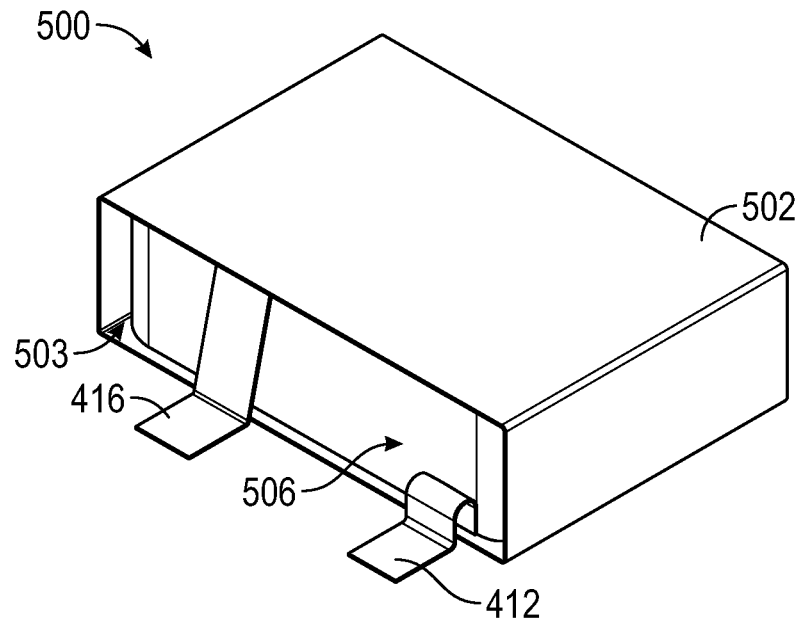
Figure 16:
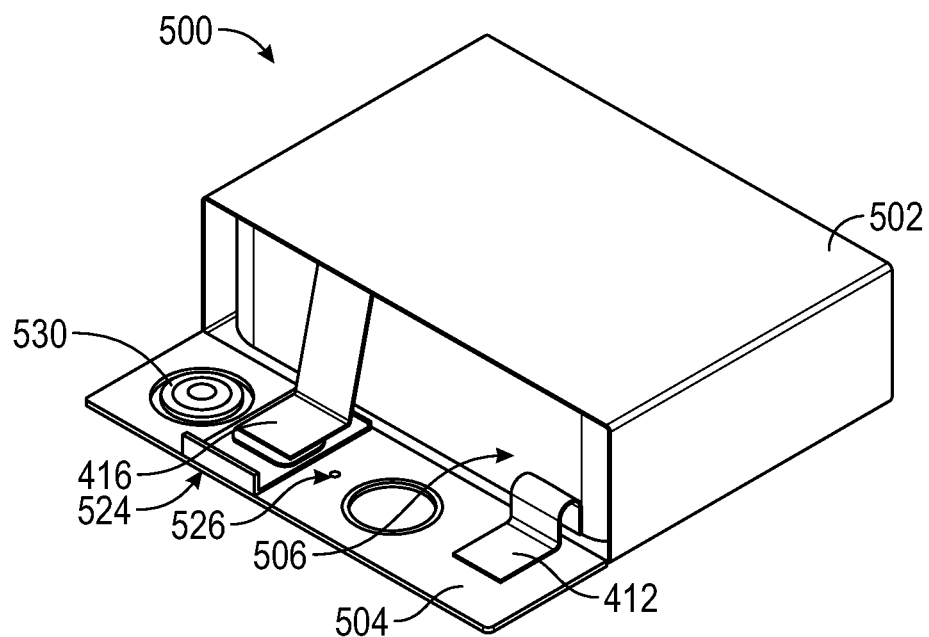
Figure 17A:
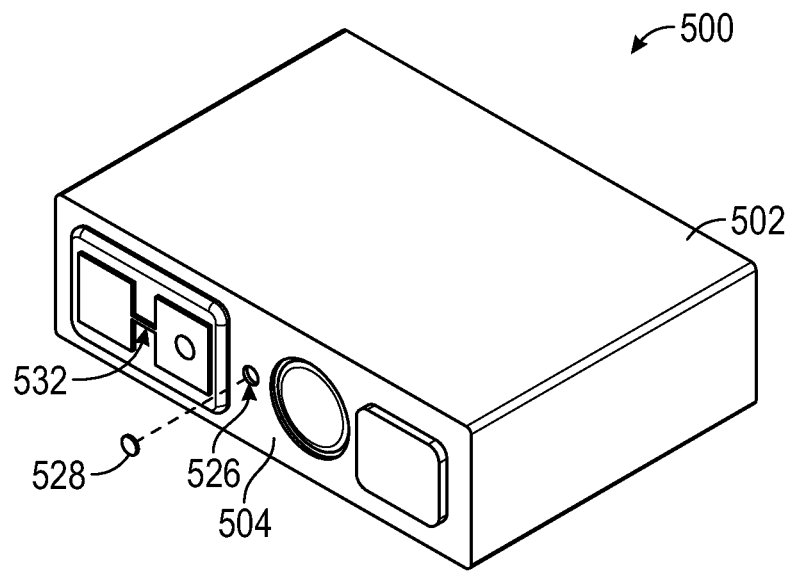
Figure 17B:
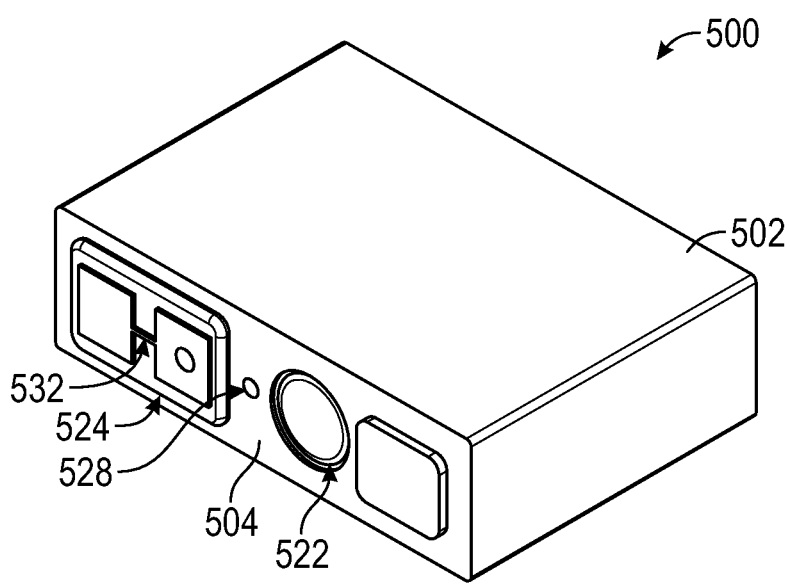

FIG. 13 schematically depicts a perspective view of an exemplary support member assembly, according to the present disclosure;

FIG. 14 schematically depicts a perspective view of an exemplary support member assembly, according to the present disclosure;

FIG. 15 schematically depicts a partially assembled perspective view of an exemplary multi-core lithium ion battery, according to the present disclosure;

FIG. 16 schematically depicts a partially assembled perspective view of an exemplary multi-core lithium ion battery, according to the present disclosure;

FIG. 17A schematically depicts a partially assembled perspective view of an exemplary multi-core lithium ion battery, according to the present disclosure; and FIG. 17B schematically depicts an assembled perspective view of an exemplary multi-core lithium ion battery, according to the present disclosure.

DETAILED DESCRIPTION

The present disclosure provides a system/method for delivering electrolyte to a jelly roll assembly to maximize the quantity of electrolyte retained within the jelly roll assembly. Furthermore, the disclosed system/method ensures the electrolyte is delivered promptly, efficiently, and without waste. The present disclosure also provides an advantageous multi-core lithium ion battery having an advantageous bus bar assembly positioned therein. The multi-core lithium ion battery has been previously disclosed in U.S. Pat. Nos. 9,685,644 and 9,871,236. The foregoing patents are incorporated herein by reference.

A multi-core lithium ion battery is described having a sealed enclosure with a support member disposed within the sealed enclosure. The support member including a plurality of cavities and a plurality of jelly roll assemblies, disposed within a corresponding one of the plurality of cavities. There may be a plurality of cavity liners, each positioned between a corresponding one of the lithium ion core members and a surface of a corresponding one of the cavities. The support member includes a kinetic energy absorbing material and the kinetic energy absorbing material is formed of one of aluminum foam, ceramic, and plastic. The cavity liners may be formed of a plastic material and the plurality of cavity liners may be formed as part of a monolithic liner member. There is further included an electrolyte contained within each of the cores and the electrolyte includes at least one of a flame retardant, a gas generating agent, and a redox shuttle.

Each lithium ion core member includes an anode, a cathode and a separator disposed between each anode and cathode. There is further included an electrical connector within said enclosure electrically connecting said core members to an electrical position internal and/or external to the sealed enclosure. The electrical connector includes two bus bars, the first bus bar interconnecting the anodes of said core members to a negative position (e.g., terminal member or fuse assembly), the second bus bar interconnecting the cathodes of said core members to a positive position (e.g., terminal member or the sealed enclosure) of the enclosure. Additional embodiments, as discussed in the above U.S. Patents, are also incorporated into the presented disclosure and the above embodiment is not intended to be limiting.

Electrolyte Filling System/Method

Advantageous manufacturing assemblies (e.g., electrolyte filling assemblies), disclosed herein, facilitate the filling of at least one jelly roll assembly. More particularly, in various exemplary embodiments, the disclosed filling assemblies may fill a plurality of jelly roll assemblies, which may be housed within a multi-core lithium ion battery. In yet another exemplary embodiment, the disclosed filling assemblies may fill a plurality of multi-core lithium ion batteries simultaneously, which further house a plurality of jelly roll assemblies.

The advantageous manufacturing assembly may be configured and dimensioned to directly/indirectly contain at least one multi-core lithium ion battery. Manufacturing assembly (e.g., electrolyte filling assembly) may be fabricated from a two-part construction, featuring a top (e.g., a fixture top) and a base (e.g., a fixture base). The fixture top may be movable relative to the fixture base. Particularly, fixture top and fixture base may be aligned and slidably engaged. The fixture top and the fixture base may include features that, when assembled, form a chamber. Once slidably engaged, the fixture top and the fixture base may be oriented in two configurations, an open configuration (e.g., an unsealed chamber) and a closed configuration (e.g., a sealed chamber). At least one of the fixture top and the fixture base may include features to interface with the at least one multi-core lithium ion battery. The disclosed features may assist in aligning and/or retaining the at least one multi-core lithium ion battery to the at least one of the fixture top and the fixture base.

At least one of the fixture top and the fixture base may include at least one electrolyte filling hose assembly. The electrolyte filling hose assembly may be configured and dimensioned to interact with at least one jelly roll assembly. For example, to fill at least one jelly roll assembly with a predetermined amount of electrolyte. The disclosed electrolyte filling assembly may be configured with a pressure line to positively or negatively adjust the internal pressure of the chamber (e.g., adding positive pressure or applying a vacuum). The disclosed electrolyte filling assembly may be configured to fill the at least one jelly roll assembly while exposed to a pressure. For example, filling the at least one jelly roll assembly while exposed to a positive pressure or while exposed to a vacuum. In yet another example, filling the at least one jelly roll assembly while exposed to a predetermined pressure schedule. The disclosed predetermined pressure schedule may include systematically alternating the exposure to positive pressure and a vacuum. In yet another embodiment, a set of electrolyte filling hose assemblies may be configured and dimensioned to interact with a corresponding number of jelly roll assemblies. Particularly, a set of 24 electrolyte filling hose assemblies which are configured and dimensioned to interact with a corresponding 24 jelly roll assemblies. The set of 24 electrolyte filling hose assemblies may simultaneously fill the corresponding 24 jelly roll assemblies.

Referring now to the drawings, like parts are marked throughout the specification and drawings with the same reference numerals, respectively. Drawing figures are not necessarily to scale and in certain views, parts may have been exaggerated for purposes of clarity.

FIGS. 1A and 1B illustrate an advantageous electrolyte filling assembly 10 with at least one multi-core lithium ion battery 70 positioned therein. FIG. 1A depicts filling assembly (e.g., electrolyte filling assembly) 10 in an open position and FIG. 1B depicts electrolyte filling assembly 10 in a closed position. Electrolyte filling assembly 10 includes fixture top 12 which is relative to fixture base 14. Fixture top 12 and fixture base 14 may be aligned and slidably engaged. Fixture top 12 may include at least one guide hole 18 which is configured and dimensioned to engage at least one post 20 of fixture base 14. However, additional alignment and engagement methods are anticipated. Fixture top 12 and fixture base 14 may include features that, when assembled, form chamber 22. Chamber 22 may at least partially encapsulate at least one multi-core lithium ion battery 70.

Fixture top 12 and/or fixture base 14 may include features to interface with at least one multi-core lithium ion battery 70. The disclosed features may assist in aligning and/or retaining at least one multi-core lithium ion battery 70 to fixture top 12 and/or fixture base 14. Retaining cover 58 may further be used to ensure multi-core lithium ion battery 70 is properly positioned within filling assembly 10. Fixture top 12 and/or fixture base 14 may include at least one electrolyte filling hose assembly. Hole(s) 60 of cover 58 provide accessibility to multi-core lithium ion battery 70 positioned below.

In an exemplary embodiment, fixture top 12 includes body 24 having top surface 26, bottom surface 28, and partition walls 30, which extend outwardly from bottom surface 28. Partition walls 30 may at least partially define chamber 22. Fixture top 12 may include at least one hose assembly 16 (e.g., electrolyte filling hose assembly). Fixture top 12 may include a plurality of electrolyte filling hose assemblies 16 positioned in a grid-based pattern. The plurality of electrolyte filling hose assemblies 16 may be referred to as filling hose group 17. For example, filling hose group 17 may include at least two electrolyte filling hose assemblies 16. In an exemplary embodiment, filling hose group 17 may include 24 electrolyte filling hose assemblies 16 that correspond with respective jelly roll assemblies 72. It should be understood, however, the number of electrolyte filling hose assemblies 16 (and jelly roll assemblies 72) is only limited by the dimensions of electrolyte filling assembly 10 (and multi-core lithium ion battery 70). It should also be understood that a single electrolyte filling hose assembly 16 may be sufficient depending on the desired application. Multi-core lithium ion battery 70 is not limited to one size/type of jelly roll assemblies 72, a plurality of differing size/type of jelly roll assemblies 72 is expected.

The at least one electrolyte filling hose assembly 16 may extend at least partially through top surface 26 and chamber top surface 32. A hole may extend from top surface 26 through chamber top surface 32 such that at least a portion of electrolyte filling assembly 16 is associated with the disclosed hole. At least a portion of electrolyte filling hose assembly 16 may extend into chamber 22. Fixture top 12 may further include at least one pressure hose assembly 40.

Pressure hose assembly 40 may be at least partially configured to adjust the internal pressure of chamber 22 (e.g., adding pressure or applying a vacuum). Pressure hose assembly 40 may be associated with a pump for producing the desired pressure.

In an exemplary embodiment, electrolyte filling hose assembly 16 may include filling needle 34, which may at least partially extend from chamber top surface 32 into at least a portion of chamber 22. Electrolyte filling hose assembly 16 may further include fitting 36 and hose 38 (e.g., tube) in direct/indirect relation to filling needle 34. Fitting 36 may at least partially extend from top surface 26 in a direction opposite chamber 22. Fitting 36 may further extend at least partially into the hole extending through top surface 26 and chamber top surface 32. Fitting 36 and filling needle 34 may be in fluid communication. In one instance, fitting 36 is in direct/indirect mechanical connection with filling needle 34. In another instance, fitting 36 and filling needle 34 are not mechanically connected. In an exemplary embodiment, at least one electrolyte filling hose assembly 16 may be utilized for a respective jelly roll assembly 72. For example, if multi-core lithium ion battery 70 includes 24 jelly roll assemblies 72, then at least 24 electrolyte filling hose assemblies 16 may be utilized. Electrolyte filling hose assembly 16 may be connected to a system to pump the electrolyte into jelly roll assembly 72.

For example, the pumping system may include a peristaltic pump. Particularly, a peristaltic pump having multiple channels may be utilized. Even more particularly, a peristaltic pump having a number of channels equal to the number of electrolyte filling hose assemblies 16. However, individual peristaltic pumps may be successfully utilized.

In an alternative implementation, a multi-channel syringe pump may be used to fill the jellyrolls. In the case of a syringe pump, each channel would generally include a syringe that will be filled with electrolyte to be delivered to the jellyrolls. The pump pushes all the syringes simultaneously delivering the prescribed amount of electrolyte to each jellyroll at a desired flow rate. When the filling is complete, the pump will then retract all the syringes simultaneously. When the syringes are retracting, they will be drawing electrolyte from an electrolyte storage tank. The syringe plunger positions will be accurately controlled so the volume of electrolyte that gets loaded and dispensed from each syringe is within the specified tolerance needed for each jellyroll.

The system may further include a holding tank for the electrolyte. The holding tank may be fluidly connected to the pump.

In the open position, electrolyte filling hose assembly 16 may be situated at a first position relative to jelly roll assembly 72. In the closed position, electrolyte filling hose assembly 16 may be situated at a second position relative to jelly roll assembly 72. For example, at the first position, electrolyte filling hose assembly 16 may be situated at a predetermined distance from jelly roll assembly 72, thereby enabling free movement of multi-core lithium ion battery 70. Furthermore, in the first position, electrolyte filling hose assembly 16 is unable to fill jelly roll assembly 72. In the second positon, however, multi-core lithium ion battery 70 is at least partially constrained and electrolyte filling hose assembly 16 is at a sufficient distance to enable filling of jelly roll assembly 72. Even more particularly, filling needle 34 may be at least partially inserted into jelly roll assembly 72, as depicted in FIG. 1B. In one instance, filling needle 34 may be inserted into jelly roll assembly 72 until filling needle 34 touches the bottom internal surface of jelly roll assembly 72. The process of filling at least one jelly roll assembly 72 will be discussed below.

Fixture base 14 may include body 46 having top surface 48, bottom surface 50, and sealing surface 52, which may be substantially parallel to top surface 48. Sealing surface 52 may be positioned between top surface 48 and bottom surface 50. Sealing surface 52 may interface with bottom edge 33 of partition wall 30, thereby substantially forming chamber 22. Sealing surface 52 may further include an at least partially flexible material to assist in forming a sealed chamber 22. For example, sealing surface 52 may include gasket 54 (e.g., rubber gasket). Fixture base 14 may include at least one feature for capturing multi-core lithium ion battery 70. Fixture base 14 may include recessed surface 56 for capturing multi-core lithium ion battery 70. Recessed surface 56 may define at least a portion of chamber 22.

FIGS. 2A and 2B illustrate an advantageous electrolyte filling assembly 100 with at least one multi-core lithium ion battery 70 positioned therein. FIG. 2A depicts electrolyte filling assembly 100 in an open position and FIG. 2B depicts electrolyte filling assembly 100 in a closed position. Electrolyte filling assembly 100 includes fixture top 102 which is relative to fixture base 104. Fixture top 102 and fixture base 104 may be aligned and slidably engaged. Fixture top 102 may include at least one guide hole 106 which is configured and dimensioned to engage with at least one post 108 of fixture base 104. However, additional alignment and engagement methods are anticipated. Fixture top 102 and fixture base 104 may include features that, when assembled, form at least one chamber 110. At least one chamber 110 may at least partially encapsulate at least one multi-core lithium ion battery 70. In an exemplary embodiment, electrolyte filling assembly 100 may include one chamber 110 for each multi-core lithium ion battery 70. In another exemplary embodiment, chamber 110 may be sealed when electrolyte filling assembly 100 is in the closed position, such that gas and/or liquid does not enter into and/or escape from chamber 110.

In an exemplary embodiment, as depicted in FIGS. 2A-3, electrolyte filling assembly 100 may include 8 multi-core lithium ion batteries 70. The only constraint on the quantity of multi-core lithium ion batteries 70 is the size of electrolyte filling assembly 100. It should be noted that electrolyte filling assembly 100 will function if one or more multi-core lithium ion battery 70 slots are vacant. Specifically, fixture base 104 may include 8 multi-core lithium ion batteries 70 positioned in close proximity to surface 112. Features may be included to assist in aligning and/or retaining multi-core lithium ion batteries 70.

In an exemplary embodiment, fixture top 102 is defined by top surface 116, bottom surface 118, and sidewalls 120. At least partially extending from bottom surface 118 is at least one chamber 110, which is at least partially defined by engagement surface 122. Electrolyte filling assembly 100 may further include at least one electrolyte filling hose assembly 16, as described above. In an exemplary embodiment, electrolyte filling assembly 100 may include filling hose group 17, wherein the number of electrolyte filling hose assemblies 16 coincides with the number of jelly roll assemblies 72. Electrolyte filling hose assemblies 16 of filling hose group 17 may be positioned in a grid-based pattern. Filling hose group 17 may include 24 electrolyte filling hose assemblies 16. Additionally, electrolyte filling assembly 100 may include at least two filling hose groups 17. For example, electrolyte filling assembly 100 may include 8 filling hose groups 17, positioned relative to the respective multi-core lithium ion batteries 70. Electrolyte filling assembly 100 may further include at least one pressure hose assembly (not shown). In an exemplary embodiment, electrolyte filling assembly 100 may include at least one pressure hose assembly (not shown) for each chamber 110. Pressure hose assembly (not shown) may be configured to adjust the internal pressure of chamber 110 (e.g., adding pressure or applying a vacuum). Pressure hose assembly (not shown) may be connected to a pump.

The at least one electrolyte filling hose assembly 16 may extend at least partially through top surface 116 and bottom surface 118. A hole may extend from top surface 116 through bottom surface 118 such that at least a portion of electrolyte filling hose assembly 16 is associated with the disclosed hole. At least a portion of electrolyte filling hose assembly 16 may extend into chamber 110. Electrolyte filling hose assembly 16 may be connected to a system to pump the electrolyte into jelly roll assembly 72. For example, pump may include a peristaltic pump.

Particularly, a peristaltic pump having multiple channels may be employed. Even more particularly, a peristaltic pump having a number of channels equal to the number of electrolyte filling hose assemblies 16. However, individual peristaltic pumps may be successfully utilized. As previously disclosed, a multi-channel syringe pump may be also used to fill the jellyrolls. In the case of a syringe pump, each channel would generally include a syringe that will be filled with electrolyte to be delivered to the jellyrolls. The pump pushes all the syringes simultaneously delivering the prescribed amount of electrolyte to each jellyroll at a desired flow rate. When the filling is complete, the pump will then retract all the syringes simultaneously. When the syringes are retracting, they will be drawing electrolyte from an electrolyte storage tank. The syringe plunger positions will be accurately controlled so the volume of electrolyte that gets loaded and dispensed from each syringe is within the specified tolerance needed for each jellyroll.

The system may further include a holding tank for the electrolyte. The holding tank may be fluidly connected to the pump.

In the open position, electrolyte filling hose assembly 16 may be situated at a first position relative to jelly roll assembly 72. In the closed position, electrolyte filling hose assembly 16 may be situated at a second position relative to jelly roll assembly 72. For example, at the first position, electrolyte filling hose assembly 16 may be situated a predetermined distance from jelly roll assembly 72 in order to enable free movement of multi-core lithium ion battery 70. Furthermore, in the first position, electrolyte filling hose assembly 16 is unable to fill jelly roll assembly 72. In the second positon, however, multi-core lithium ion battery 70 is at least partially constrained and electrolyte filling hose assembly 16 is at a sufficient distance to enable filling of jelly roll assembly 72. Even more particularly, filling needle (not shown) may be at least partially inserted into jelly roll assembly 72. In one instance, filling needle (not shown) may be inserted into jelly roll assembly 72 until filling needle (not shown) touches the bottom internal surface of jelly roll assembly 72. The process of filling at least one jelly roll assembly 72 will be discussed below.

Electrolyte filling assembly 10, 100 may be positioned in a structure with at least one shelf. For example, as depicted in FIG. 4, electrolyte filling assembly 100 may be positioned within rack 202. Although electrolyte filling assembly 10 is not depicted, it should be understood that any exemplary embodiment of the electrolyte filling assemblies may be utilized. Rack assembly 200 may further include at least one pump 208. Rack 202 may include at least one shelf 204 for receipt of at least one electrolyte filling assembly 100 and/or pump 208. Shelf 204 may further include track 206 to align and/or retain at least one electrolyte filling assembly 100. In one embodiment, track 206 may include rollers such that at least one electrolyte filling assembly 100 may be slidingly moved relative to rack 202 and shelf 204. In another embodiment, shelf 204 may include rollers such that shelf 204 may be slidingly moved relative to rack 202. In another embodiment, the height of shelf 204 may be sufficient to house electrolyte filling assembly 100 in the open position. In an exemplary embodiment, at least one pump 208 may be utilized (e.g., fluidly connected) for each filling hose group 17. More particularly, one pump 208 may be utilized for each filling hose group 17, wherein pump 208 is a peristaltic pump or a syringe pump as described herein. Even more particularly, one peristaltic pump 208 having 24 channels may be utilized for each filling hose group 17 having 24 electrolyte filling hose assemblies 16.

For ease of review, FIGS. 5A-5C illustrate an exemplary jelly roll assembly 72. The disclosed jelly roll assembly 72 in FIGS. 5A-5C is by no way intended to limit the jelly roll assemblies that are capable of being filled by the disclosed electrolyte filling assembly. The disclosed jelly roll assembly 72 is merely provided to supplement the present disclosure. Jelly roll assembly 72 includes jelly roll 74, jelly roll tab 78, jelly roll can 80, and cap 82, wherein jelly roll can 80 and cap 82 encase jelly roll 74. Jelly roll tab 78 may protrude through cap 82 and is designed to interface with at least one bus bar (not shown). Electrolyte may be introduced into jelly roll 74 through hole 84 of cap 82, which is substantially concentric with longitudinally-positioned hole 76 of jelly roll 74. The disclosed jelly roll assembly 72 is not a sealed cell. To produce repeatable performance, a predetermined volume of electrolyte is introduced into jelly roll assembly 72. In some instances, in order to achieve the predetermined volume of electrolyte, absorption of the electrolyte into jelly roll 74 is required. Absorption and quantity of electrolyte is dependent on the size/type of jelly roll assemblies 72. The filling processes discussed herein provides an efficient and repeatable method to ensure maximum absorption within a desired time. As stated above, overfilling of jelly roll assembly 72 exposes unnecessary risks to both jelly roll assembly 72 and multi-core lithium ion battery 70.

In an exemplary process 300, as outlined in FIG. 6, the disclosed electrolyte filling process may be automated, manual, and a combination thereof. Electrolyte filling assembly 10, 100 may be at least partially utilized to perform the disclosed filling process. Although the disclosed process is performed on a multi-core lithium ion battery (e.g., supercell), the disclosed process may also be performed on individual jelly roll assemblies. Regardless of the structure to be filled (e.g., jelly roll assembly or supercell), filling process 300 is consistent. Therefore, with regards to the process below, substitution of "jelly roll assembly" for "supercell" is anticipated. In the supercell configuration, the jelly roll assemblies may be filled before or after insertion into the sealed supercell enclosure. For instance, jelly roll assemblies positioned within the disclosed support member may be filled prior to insertion into the disclosed enclosure.

To begin, at step 302, the supercell (or jelly roll assembly) is weighed prior to filling. The pre-fill weight provides a baseline for determining the amount of electrolyte absorbed by the individual jelly roll assemblies.

Next, at step 304, the supercell is loaded into an electrolyte filling assembly (e.g., electrolyte filling assembly 10, 100) configured in an open position. Next, at step 306, the electrolyte filling assembly is closed and sealed. In one embodiment, fixture top 12, 102 and fixture base 14, 104 may be slidably engaged, wherein engagement of fixture top 12, 102 and fixture base 14, 104 creates chamber 22, 110, which may encapsulate the supercell. Fixture base 14, 104 may be stationary on a working surface (e.g., counter, table, desk, etc.). Fixture top 12, 102 may be aligned with fixture base 14, 104 such that hole 18, 106 and shaft 20, 108 are substantially concentric. As discussed above, in the closed position, the at least one filling needle may be in close proximity to the jelly roll assembly.

Next, at step 308, electrolyte filling assembly 10, 100 is tested to ensure the at least one chamber is sufficiently sealed, such that the chamber pressure may be altered and/or maintained without the loss of pressure. If, however, the chamber does not sufficiently seal, electrolyte filling assembly 10, 100 will be resealed in accordance with step 306 and will then be retested in accordance with step 308.

Next, at step 310, the sufficiently sealed electrolyte filling assembly 10, 100 is exposed to a combination of pressure cycling and electrolyte flow. The pressure/flow process may be altered to achieve desired results. In one embodiment, vacuum may be applied to chamber 22, 110, through pressure hose assembly 40, until a predetermined threshold is achieved (e.g., 5-25 in Hg). Pump (e.g., peristaltic pump or syringe pump) 208 is activated to deliver electrolyte to the at least one electrolyte filling hose assembly 16. Vacuum may be kept constant throughout at least a portion of the filling process or may be turned off such that the level of vacuum in the chamber may change throughout the filling process. The at least one electrolyte filling hose assembly 16 delivers the electrolyte to the at least one jelly roll assembly 72. Pump 208 may be set to a predetermined flow profile. The predetermined flow profile may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72. Filling may occur continuously under vacuum for a predetermined amount of time (e.g., 40-60 minutes). Once the desired amount of electrolyte is achieved, the pressure of chamber 22, 110 may be increased at a controlled rate until atmospheric pressure is achieved. The above process may be at least partially repeated to ensure desired results.

In another embodiment, vacuum may be applied to chamber 22, 110, through pressure hose assembly 40, as discussed above. Vacuum levels may be between about 5-25 inHg. Pump 208 may deliver electrolyte at a desired flow rate to electrolyte filling hose assembly 16, which then delivers the electrolyte to the respective jelly roll assemblies 72. Vacuum may be kept constant throughout at least a portion of the filling process or may be turned off such that the level of vacuum in the chamber may change throughout the filling process. The desired flow rate may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72. In contrast to above, the pressure in chamber 22, 110 may be increased for a predetermined amount of time. For example, a pressure close to atmospheric pressure or above atmospheric pressure. Such increase in pressure further assists absorption of the electrolyte by jelly roll assembly 72. A vacuum may then be applied to chamber 22, 110, and electrolyte filling may continue, as discussed above. Once the desired amount of electrolyte is absorbed, the pressure of chamber 22, 110 may be increased at a controlled rate until atmospheric pressure is achieved. The above process may be at least partially repeated to ensure desired results.

In yet another embodiment, under vacuum, electrolyte may be rapidly delivered to the respective jelly roll assembly 72, using techniques discussed above, followed by a flow rate similar to the absorption rate of jelly roll assembly. Alternating between a faster flow rate and a slower flow rate is hereinafter referred to as variable flow rate. The variable flow rate may be altered in real-time depending on the absorption of jelly roll assembly 72. The rapid delivery of electrolyte may fill the free volume of jelly roll assembly 72. Once a predetermined threshold is achieved (e.g., flow time, weight of jelly roll assembly), the flow rate may be reduced to ensure proper absorption by jelly roll assembly 72. A controlled flow rate may deliver the remaining electrolyte, as desired, to achieve a predetermined amount. The desired flow rate may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72. Vacuum may be kept constant throughout at least a portion of the filling process or may be turned off such that the level of vacuum in the chamber may change throughout the filling process. Once the desired amount of electrolyte is absorbed, the pressure of chamber 22, 110 may be increased at a controlled rate until atmospheric pressure is achieved. The above process may be at least partially repeated to ensure desired results.

In an exemplary embodiment, a predetermined amount of electrolyte is rapidly delivered into jelly roll assembly 72, as discussed above. For example, if jelly roll assembly 72 traditionally holds approximately 3.5 grams of electrolyte, and 8 grams of electrolyte is desired, approximately 3 grams of electrolyte may be rapidly delivered. Jelly roll assembly 72 may be filled using a variable flow rate. Vacuum may be applied to chamber 22, 110, through pressure hose assembly 40 until a desired pressure is achieved (e.g., 5-25 in Hg). Once under vacuum, the remaining electrolyte is precisely delivered to jelly roll assembly 72 over a predetermined period of time (e.g., 40-60 minutes). Vacuum may be kept constant throughout at least a portion of the filling process or may be turned off such that the level of vacuum in the chamber may change throughout the filling process. The desired flow rate may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72. Optionally, positive pressure may be applied to assist absorption of the electrolyte by jelly roll assembly 72. Once the desired quantity of electrolyte is absorbed, pressure in chamber 22, 110 may be increased at a controlled rate until the desired pressure is achieved. The above process may be at least partially repeated to ensure desired results.

In yet another exemplary embodiment, vacuum is applied to chamber 22, 110, through pressure hose assembly 40 until a desired threshold is achieved (e.g., 5-25 in Hg). Jelly roll assembly 72 may be filled with electrolyte using a variable flow rate or through a constant flow rate. In the case of the variable flow rate, a predetermined amount of electrolyte is rapidly delivered into jelly roll assembly 72, as discussed above. For example, if jelly roll assembly 72 traditionally holds approximately 3.5 grams of electrolyte, and 8 grams of electrolyte is desired, approximately 3 grams of electrolyte may be rapidly delivered. At which time, a constant flow rate may be applied, as described above. Vacuum may be kept constant throughout at least a portion of the filling process or may be turned off such that the level of vacuum in the chamber may change throughout the filling process.

The desired flow rate may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72.

The desired flow rate may also depend on the electrolyte available to be pumped. Said differently, a series of reservoirs may be fluidly connected to the inlet side of pump (e.g., peristaltic pump or syringe pump) 208. Particularly, each outlet channel of pump 208 may have a corresponding inlet, wherein each corresponding inlet is fluidly connected to a corresponding reservoir. Each corresponding reservoir may be filled with a predetermined amount of electrolyte, depending on the size/type of jelly roll assembly 72. During filling, pump 208 will dispense the available electrolyte into the respective jelly roll assembly 72. Therefore, pump 208 is not relied on to deliver an exact amount of electrolyte. Each channel of pump 208 is capable of dispensing a differing amount of electrolyte.

Optionally, positive pressure may be applied to assist absorption of the electrolyte by jelly roll assembly 72. Once the desired quantity of electrolyte is absorbed, pressure in chamber 22, 110 may be increased at a controlled rate until the desired pressure is achieved. The above process may be at least partially repeated to ensure desired results.

In another exemplary embodiment, as depicted in FIG. 7, vacuum may be applied to chamber 22, 110, through pressure hose assembly 40, until a predetermined threshold is achieved (e.g., −20 in Hg). Once under vacuum, pump (e.g., peristaltic pump or syringe pump) 208 is activated to deliver electrolyte to the at least one electrolyte filling hose assembly 16. The at least one electrolyte filling hose assembly 16 delivers the electrolyte to the at least one jelly roll assembly 72. Vacuum may be kept constant throughout at least a portion of the filling process or may be turned off such that the level of vacuum in the chamber may change throughout the filling process. The desired flow rate may be dependent on the absorption rate of jelly roll assembly 72. For example, the absorption rate of jelly roll assembly 72 after the free volume in jelly roll assembly 72 is full. In one example, the predetermined flow rate may be 0.1-0.15 ml/min. However, additional flow rates are expected based on the size/type of jelly roll assembly 72. Filling may occur continuously under vacuum for a predetermined amount of time (e.g., 25-30 minutes). Once the desired amount of electrolyte is absorbed, the pressure of chamber 22, 110 may be increased at a controlled rate until atmospheric pressure is achieved (e.g., 10 minutes). The above process may be at least partially repeated to ensure desired results.

In another embodiment, electrolyte filling hose assembly 16 includes a reservoir. The disclosed reservoir may be used in addition to electrolyte filling assembly 10, 100 or may replace electrolyte filling assembly 10, 100. Each of the above embodiments may be modified to include a reservoir. The disclosed reservoir may be filled with a predetermined quantity of electrolyte and may at least partially rely on gravity to deliver the desired amount of electrolyte to jelly roll assembly 72.

Electrolyte filling assembly 10, 100 may simultaneously fill each jelly roll assembly 72 within multi-core lithium ion battery 70. Further, electrolyte filling assembly 100 may simultaneously fill each multi-core lithium ion battery 70. As discussed above, electrolyte filling is done so that the entire jelly roll is equally wetted throughout the roll with no dry areas allowed. It is preferred that each core member has the equivalent amount of electrolyte from core to core, with a variation within 0.5 g, and even more preferred within 0.1 g and yet even more preferred within 0.05 g. The variation adjusts with the total amount electrolyte and is typically less than 5% or even more preferred <1% of the total amount of electrolyte per core. Placing the assembly in a vacuum helps with this filling process and is crucial for full and equal wetting of the electrodes.

Electrolyte filling assembly 10, 100 may further include measurement equipment to monitor the quantity of electrolyte. Particularly, the measurement equipment may determine the quantity of electrolyte left in the system (e.g., tank) and/or introduced into jelly roll assembly 72. The measurements may include pressure, flow, time, temperature, weight, and any combination thereof. Therefore, although weight is described as the guideline for ensuring an acceptable amount of electrolyte is delivered to jelly roll assembly 72, any one of the above mentioned measurement tests may be utilized.

Next, at step 312, after completion of the electrolyte filling, electrolyte filling assembly 10, 100 is opened to enable removal of the supercell (Step 314). The supercell is weighed to determine the post-fill weight (Step 316).

Lastly, at step 318, the actual weight (i.e., the difference between the post-fill weight and the pre-fill weight) is compared to the target weight. If the actual weight is within a predetermined allowable variation, then the filled supercell passes and is complete. If the actual weight is outside the predetermined allowable variation, then the filled supercell fails and may be refilled or scrapped.

Multi-Core Lithium Ion Battery Packaging/Bus Bar

As mentioned above, a multi-core lithium ion battery is described having a sealed enclosure with a support member disposed within the sealed enclosure. The support member including a plurality of cavities and a plurality of lithium ion core members ("jelly roll assemblies), disposed within a corresponding one of the plurality of cavities. The openings of the disclosed cavities may be exposed to a shared atmosphere region within the enclosure. In the event of a failure of a lithium ion core member and a resulting fire, the gasses expelled are able to occupy the shared environment region, which provides significantly more volume than would be available in a typical individually 'canned' core member. Each lithium ion core member includes an anode, a cathode and a separator disposed between each anode and cathode. There is further included an electrical connector within said enclosure electrically connecting said core members to an electrical position internal/external to the sealed enclosure. The electrical connector includes two bus bars, the first bus bar interconnecting the anodes of said core members to a negative position (e.g., terminal member or fuse assembly), the second bus bar interconnecting the cathodes of said core members to a positive position (e.g., terminal member or the sealed enclosure) of the enclosure.

In an exemplary embodiment, as disclosed in FIGS. 8A-12, multi-core lithium ion battery 400 includes can 402 and cover 404, collectively referred to as "enclosure" (See FIGS. 9A-9B). Can 402 may be fabricated from a single piece of conductive material using traditional fabrication methods. For example, can 402 may be fabricated from deep drawing. Can 402 and cover 404 may be fabricated from a thermally and electrically conductive material. Such as, aluminum coated plastics, aluminum coated ceramics, nickel coated steel, among others. Positioned relative to can 402 is support member assembly 406, including support member 408, jelly roll assemblies 72, negative bus bar 414 and positive bus bar 410 (See FIG. 10). As shown in FIG. 10, jelly roll assemblies 72 are positioned relative to support member 408. Particularly, cavities (not shown) are positioned within support member 408 so that jelly roll assemblies 72 may be housed with adequate separation, so that limited expansion can take place during charge and discharge reactions thereby preventing mechanical interaction of jelly roll assemblies 72. Furthermore, cylindrical cavities (not shown) may have openings with a diameter that is slightly larger than those of jelly roll assembly 72.

Positive bus bar 410 interfaces with a plurality of the cathodes of jelly roll assemblies 72 (See FIG. 10). Particularly, bus bar 410 may be at least semi-permanently attached to jelly roll assembly 72. For example, at least a portion of the perimeter of the cathode end of jelly roll assembly 72 may be welded to positive bus bar 410. Positive bus bar 410 may further include connection region (e.g., tab) 411. Connection region 411 may be at least partially positioned within the perimeter of positive bus bar 410, may be at least partially positioned on a tab that extends at least some distance from positive bus bar 410, or a combination thereof. Positioned relative to connection region 411 is at least one connective structure 412 (See FIG. 12). Connective structure 412 may be attached to connection region 411. Connective structure 412 may be attached to connection region 411 through traditional features, including, welding, fasteners, adhesives (e.g., electrically conductive adhesives), integrated features, and any combination thereof.

Negative bus bar 414 interfaces with a plurality of the anodes of jelly roll assemblies 72 (See FIG. 8A). Particularly, jelly roll tab 78 may be at least semi-permanently attached to negative bus bar 414. For example, jelly roll tab 78 may be redirected (e.g., bent) to interface with negative bus bar 414. Jelly roll tab 78 may be welded to negative bus bar 414. Negative bus bar 414 may further include connection region (e.g., tab) 415. Connection region 415 may be at least partially positioned within the perimeter of negative bus bar 414, may be at least partially positioned on a tab that extends at least some distance from negative bus bar 414, or a combination thereof. Positioned relative to connection region 415 is at least one connective structure 416 (See FIG. 11). Connective structure 416 may be attached to connection region 415. Connective structure 416 may be attached to connection region 415 through traditional features, including, welding, fasteners, adhesives (e.g., electrically conductive adhesives), integrated features, and any combination thereof.

Connective structure 412, 416 may be at least partially flexible. Connective structure 412, 416 may be shaped (e.g., fold, bend) to a desired orientation (e.g., 90 degrees). Connective structure 412, 416 may be resilient such that connective structure 412, 416 may regain at least a portion of its pre-shaped features. Connective structure 412, 416 may be fabricated from at least one thin sheet of conductive material (e.g., metal). Connective structure 412, 416 may be fabricated from a plurality of thin sheets of stacked conductive material. For example, connective structure 412, 416 may be fabricated from about 10 thin sheets of stacked conductive material. In an exemplary embodiment, connective structure 412 is fabricated from at least one thin aluminum sheet. Particularly, connective structure 412 is fabricated from a plurality of thin aluminum sheets (e.g., 10 sheets). In another exemplary embodiment, connective structure 416 is fabricated from at least one thin copper sheet. Particularly, connective structure 416 is fabricated from a plurality of thin copper sheets (e.g., 10 sheets). In another embodiment, connective structure 412, 416 may be fabricated from a braided conductive material (e.g., metal).

FIGS. 8A-8C illustrate an exemplary assembly process of can 402 and support member assembly 406. Particularly, support member assembly 406 may be slid into can 402 such that connective structure 412, 416 is positioned in close proximity to opening 403 of can 402. As shown in FIG. 9A, cover 404 may be positioned relative to opening 403 of can 402. For example, cover 404 may be positioned substantially perpendicular to opening 403. Connective structure 412 may be positioned relative to cover 404, thereby completing the positive connection. For example, connective structure 412 may be fastened to cover 404 (e.g., welding methods, fasteners). Connective structure 416 may be positioned relative to negative terminal 420. For example, connective structure 416 may be fastened to negative terminal 420 (e.g., welding methods, fasteners). In another embodiment, connective structure 412 and/or connective structure 416 may be positioned relative to at least one terminal positioned external to can 402 and cover 404. Attachment of connective structure 412, 416 to cover 404 thereby defines a first position, wherein cover 404 is in close proximity to case 402 and at least partially engaged with case 402.

Cover 404 and connective structure 412, 416 may be positioned relative to opening 403, thereby defining a second position (FIG. 9B). Cover 404 may be rotated, pivoted, moved from the first position to the second position in order to at least partially enclose support member assembly 406. For example, cover 404 may be rotated about 90 degrees between the first position and the second position. Connective structure 412, 416 may conform to the movement of cover 404. For example, connective structure 412, 416 may bend or fold in a manner where connective structure 412, 416 does not impede the movement of cover 404 from the first position to the second position. During such movement, connective structure 412, 416 may be shaped to the desired orientation, as described above. In the second position, cover 404 may be assembled (e.g., welding methods, fasteners) to can 402, thereby sealing support member assembly 406 within.

In yet another aspect, one or more blanket-like structures may be provided within the disclosed enclosure. The blanket-like structure(s) are generally configured and dimensioned so as to be positionable in proximity to the lithium ion core member(s), e.g., atop an open jelly roll, such that any gas/fluid flow into or from the lithium ion core member(s) encounters the blanket-like structure. Thus, the blanket-like structure may advantageously function to substantially limit the quantity of hot particulate residue, e.g., liquid electrolyte and electrolyte gas, that may be emitted from the lithium ion core member from undesirably interacting with adjacent lithium ion core members/jelly rolls. The blanket-like structure(s) may feature flow characteristics that promote axial gas flow relative to the blanket-like structure, but that substantially reduces lateral (e.g., side-to-side) flow therewithin. Therefore, according to exemplary embodiments, gas and/or other fluids that are emitted by a lithium ion core member/jelly roll is preferentially directed in a substantially axial manner through the blanket-like structure to shared atmosphere of the enclosure (or individual compartmentalized region). To the extent the pressure within the atmospheric region exceeds an applicable pressure threshold, vent mechanism 422 associated with the disclosed enclosure may be activated, whereby the gas is vented from the enclosure to the external environment.

In exemplary embodiments, a pressure disconnect device ("PDD") advantageously electrically isolates jelly roll assemblies 72 associated with the lithium ion battery in response to a build-up of pressure within the disclosed enclosure that exceeds a predetermined pressure threshold. The PDD may be in close proximity to negative terminal 420 and may include deflectable dome 424 and fuse assembly 426 positioned on an external face of the disclosed enclosure that is adapted, in response to a pressure build-up within the disclosed enclosure beyond a threshold pressure level, to electrically isolate lithium ion battery components within the disclosed enclosure. Attached to the fuse assembly is a structural feature that is aligned with the center line of the deflectable dome.

When the internal pressure reaches the PDD threshold value, deflectable dome 424 pops up to contact the structural feature causing a short circuit between positive and negative terminals, which results in fuse failure. After the fuse 426 has failed (i.e., "blown"), the negative terminal connecting to the external circuit is isolated from jelly rolls in the container, and the negative terminal is kept connecting to the positive terminal via the disclosed enclosure and structural feature, resulting in current directly flowing from the negative terminal to the disclosed enclosure, i.e., by-passing jelly roll assemblies 72.

In yet another exemplary embodiment, as disclosed in FIGS. 13-17B, multi-core lithium ion battery 500 includes can 502 and cover 504, collectively referred to as "enclosure" (See FIGS. 15-17B). Can 502 may be fabricated from a single piece of conductive material using traditional fabrication methods. For example, can 502 may be fabricated from deep drawing. Can 502 and cover 504 may be fabricated from a thermally and electrically conductive material. Such as, aluminum coated plastics, aluminum coated ceramics, nickel coated steel, among others. Can 502 and/or cover 504 may further include hole 526, which remains open during formation of multi-core lithium ion battery 500 (e.g., filling jelly roll assemblies with electrolyte and initial activation of jelly roll assemblies). Once formation is complete, cap 528 may be attached (e.g., welded) to hole 526 to ensure no leaks.

Positioned relative to can 502 is support member assembly 506, including support member 508, jelly roll assemblies 72, blanket 510, negative bus bar 414 and positive bus bar 410 (not shown). Support member assembly 506 may further include an electrically isolating material 516 (e.g., Kapton® Polyimide Film (DuPont, Wilmington, Delaware)) positioned in close proximity to negative bus bar 414 (See FIG. 14). As shown in FIG. 10 (described above), jelly roll assemblies 72 are positioned relative to support member 408, 508. Particularly, cavities (not shown) are positioned within support member 408, 508 so that jelly roll assemblies 72 may be housed with adequate separation, so that limited expansion can take place during charge and discharge reactions thereby preventing mechanical interaction of jelly roll assemblies 72. Furthermore, cylindrical cavities (not shown) may have openings with a diameter that is slightly larger than those of jelly roll assembly 72.

Positive bus bar 410 (not shown) interfaces with a plurality of the cathodes of jelly roll assemblies 72 (See FIG. 10). Particularly, bus bar 410 (not shown) may be at least semi-permanently attached to jelly roll assembly 72. For example, at least a portion of the perimeter of the cathode end of jelly roll assembly 72 may be welded to positive bus bar 410 (not shown). Positive bus bar 410 (not shown) may further include connection region (e.g., tab) 411. Connection region 411 may be at least partially positioned within the perimeter of positive bus bar 410 or may be at least partially positioned on a tab that extends at least some distance from positive bus bar 410. Positioned relative to connection region 411 (not shown) is at least one connective structure 412 (See FIG. 12). Connective structure 412 may be at least partially positioned within the perimeter of positive bus bar 410 (not shown), or may be at least partially positioned on a tab that extends at least some distance from positive bus bar 410 (not shown), or any combination thereof. Connective structure 412 may be attached to connection region 411 through traditional features, including, welding, fasteners, adhesives (e.g., electrically conductive adhesives), integrated features, and any combination thereof.

Negative bus bar 414 interfaces with a plurality of the anodes of jelly roll assemblies 72 (See FIG. 13). Particularly, jelly roll tab 78 may be at least semi-permanently attached to negative bus bar 414. For example, jelly roll tab 78 may be redirected (e.g., bent) to interface with negative bus bar 414. Jelly roll tab 78 may be welded to negative bus bar 414. Negative bus bar 414 may further include connection region (e.g., tab) 415. Connection region 415 may be at least partially positioned within the perimeter of negative bus bar 414 or may be at least partially positioned on a tab that extends at least some distance from negative bus bar 414. Positioned relative to connection region 415 is at least one connective structure 416 (See FIG. 13). Connective structure 416 may be at least partially positioned within the perimeter of negative bus bar 414, or may be at least partially positioned on a tab that extends at least some distance from negative bus bar 414, or any combination thereof. Connective structure 416 may be attached to connection region 415 through traditional features, including, welding, fasteners, adhesives (e.g., electrically conductive adhesives), integrated features, and any combination thereof.

Connective structure 412, 416 may be at least partially flexible. Connective structure 412, 416 may be shaped (e.g., fold, bend) to a desired orientation (e.g., 90 degrees). Connective structure 412, 416 may be resilient such that connective structure 412, 416 may regain at least a portion of its pre-shaped features. Connective structure 412, 416 may be fabricated from at least one thin sheet of conductive material (e.g., metal). Connective structure 412, 416 may be fabricated from a plurality of thin sheets of stacked conductive material. For example, connective structure 412, 416 may be fabricated from about 10 thin sheets of stacked conductive material. In an exemplary embodiment, connective structure 412 is fabricated from at least one thin aluminum sheet. Particularly, connective structure 412 is fabricated from a plurality of thin aluminum sheets (e.g., 10 sheets). In another exemplary embodiment, connective structure 416 is fabricated from at least one thin copper sheet. Particularly, connective structure 416 is fabricated from a plurality of thin copper sheets (e.g., 10 sheets). In another embodiment, connective structure 412, 416 may be fabricated from a braided conductive material (e.g., metal).

Multi-core lithium ion battery 500 may further include a structure for controlling gas/fluid flow from jelly roll assemblies 72 positioned therewithin. In exemplary embodiments and as shown in FIGS. 13-14, the disclosed structure for controlling gas/fluid flow may take the form of blanket or mat 510 positioned in contact with (or in close proximity to) jelly roll assemblies 72—particularly the open end of jelly roll assemblies 72—housed within support member 508. Blanket 510 substantially limits the quantity of hot particulate residue, e.g., liquid electrolyte and electrolyte gas, from interacting with adjacent jelly roll assemblies 72 if/when released from one or more jelly roll assembly(ies). In exemplary embodiments, blanket 510 includes apertures/features that facilitate charging of electrolyte and electrical connection between the electrochemical units and an associated bus bar. In another exemplary embodiment, blanket 510 may electrically isolate at least a portion of jelly roll assemblies 72 from can 502 and/or cover 504. Specifically, blanket 510 may electrically isolate bus bar 414, which is in electrical connection with jelly roll assemblies 72, from an internal surface of can 502 and/or cover 504.

Blanket 510 generally features flow characteristics that promote axial gas and fluid flow through blanket 510, but substantially reduces lateral (e.g., side-to-side) flow within blanket 510. Therefore, particulates associated with such gas/fluid flow are forced through the body of blanket 510 and into a shared atmosphere of the enclosure (or individual compartmentalized region). To the extent an applicable threshold pressure is reached within the shared atmosphere, the particulate-containing gas/fluid is vented from the enclosure. For example, through vent mechanism 422, which may be associated with cover 504, whereby the gas is vented from the enclosure to the external environment. However, additional vent 522 locations is expected.

In an illustrious embodiment, blanket 510 is fabricated from a ceramic material (or similar material) with a pore size/structure that promotes axial flow therethrough. The ceramic material is typically stable at relatively high temperatures, e.g., greater than 200° C. In exemplary embodiments of the present disclosure, the pore size of the disclosed blanket is sized so as to (i) capture larger hot particulates/debris, e.g., larger sized carbonized debris, metal debris, metal oxide particulates and melted metal particulates, so as to ensure those larger particulates/debris do not contact adjacent jelly roll assemblies 72, and (ii) facilitate smaller particulates and gas in passing through blanket 510 and out vent 522 (if the vent is activated). Smaller particulates for purposes of the present disclosure are those particulates that will pass freely through vent 522 so as to not become trapped/clogged within vent 522 outlet. In an illustrious embodiment, blanket 510 is installed beneath bus bar 414; however, blanket 510 may be installed above bus bar 414. Since blanket 510 may be in close proximity to jelly roll assemblies 72, blanket 510 may additionally function as a heat sink by extracting heat away from jelly roll assemblies 72. Excessive heat buildup within jelly roll assemblies 72 may lead to premature failure and/or thermal runaway.

In an exemplary embodiment, blanket 510 may be fabricated from a thermally insulating mineral material (e.g., AFB® material, Cavityrock® material, ComfortBatt® material, and Fabrock™ material (Rockwool Group, Hedehusene, Denmark); Promafour® material, Microtherm® material (Promat Inc., Tisselt, Belgium); and/or calcium-magnesium-silicate wool products from Morgan Thermal Ceramics (Birkenhead, United Kingdom). The thermally insulating mineral material may be used as a composite and include fiber and/or powder matrices. The mineral matrix material may be selected from a group including alkaline earth silicate wool, basalt fiber, asbestos, volcanic glass fiber, fiberglass, cellular glass, and any combination thereof.

The mineral material may include binding materials, although it is not required. The disclosed building material may be a polymeric material and may be selected from a group including nylon, polyvinyl chloride ("PVC"), polyvinyl alcohol ("PVA"), acrylic polymers, and any combination thereof. The mineral material may further include flame retardant additives, although it is not required, an example of such includes Alumina trihydrate ("ATH"). The mineral material may be produced in a variety of mediums, such as rolls, sheets, and boards and may be rigid or flexible. For example, the material may be a pressed and compact block/board or may be a plurality of interwoven fibers that are spongey and compressible. Mineral material may also be at least partially associated with the inner wall of can 502 and/or cover 504, so as to provide an insulator internal of can 502 and/or cover 504.

Although the disclosed structure for controlling gas/fluid flow from electrochemical unit(s) is described/depicted as a blanket 510, it is noted that the desirable functionality of controlling gas/fluid flow may be achieved by a plurality of discrete elements that are positioned in proximity to the jelly roll assemblies, e.g., in a one-on-one manner Thus, individual gas/fluid flow elements may be positioned in proximity to the open end of individual jelly roll assemblies to facilitate axial/non-lateral flow of gas/fluid that is expelled from the jelly roll assemblies—while capturing larger particulates—as described above with reference to blanket 510. In like manner, the disclosed structure for controlling gas/fluid flow may be configured/dimensioned as a structure that provides flow control functionality with respect to a sub-set of jelly roll assemblies positioned within the enclosure, e.g., a row or column of jelly roll assemblies.

Multi-core lithium ion battery 500 may be assembled following the process discussed above with reference to FIGS. 8A-8C. Particularly, support member assembly 506 may be slid into can 502 such that connective structure 412, 416 is positioned in close proximity to opening 403 of can 402. As shown in FIG. 16, cover 504 may be positioned relative to opening 503 of can 502. For example, cover 504 may be positioned substantially perpendicular to opening 503. Connective structure 412 may be positioned relative to cover 504, thereby completing the positive connection. For example, connective structure 412 may be fastened to cover 504 (e.g., welding methods, fasteners). Connective structure 416 may be positioned relative to negative terminal 524. For example, connective structure 416 may be fastened to negative terminal 524 (e.g., welding methods, fasteners). In another embodiment, connective structure 412 and/or connective structure 416 may be positioned relative to at least one terminal positioned external to can 502 and cover 504. Attachment of connective structure 412, 416 to cover 504 thereby defines a first position, wherein cover 504 is in close proximity to case 502 and at least partially engaged with case 502.

Cover 504 and connective structure 412, 416 may be positioned relative to opening 503, thereby defining a second position (FIGS. 17A-17B). Cover 504 may be rotated, pivoted, moved from the first position to the second position in order to at least partially enclose support member assembly 506. For example, cover 504 may be rotated about 90 degrees between the first position and the second position. Connective structure 412, 416 may conform to the movement of cover 504. For example, connective structure 412, 416 may bend or fold in a manner where connective structure 412, 416 does not impede the movement of cover 504 from the first position to the second position. During such movement, connective structure 412, 416 may be shaped to the desired orientation, as described above. In the second position, cover 504 may be assembled (e.g., welding methods, fasteners) to can 502, thereby sealing support member assembly 506 within. Once formation is complete, cap 528 may be attached (e.g., welded) to hole 526 to ensure no leaks.

In exemplary embodiments, a pressure disconnect device ("PDD") advantageously electrically isolates jelly roll assemblies 72 associated with the lithium ion battery in response to a build-up of pressure within the disclosed enclosure that exceeds a predetermined pressure threshold. The PDD may be in close proximity to negative terminal 524 and may include deflectable dome 530 and fuse assembly 532 positioned on an external face of the disclosed enclosure that is adapted, in response to a pressure build-up within the disclosed enclosure beyond a threshold pressure level, to electrically isolate lithium ion battery components within the disclosed enclosure. Attached to the fuse assembly is a structural feature that is aligned with the center line of the deflectable dome.

When the internal pressure reaches the PDD threshold value, deflectable dome 530 pops up to contact the structural feature causing a short circuit between positive and negative terminals, which results in fuse failure. After the fuse 532 has failed (i.e., "blown"), the negative terminal connecting to the external circuit is isolated from jelly rolls in the container, and the negative terminal is kept connecting to the positive terminal via the disclosed enclosure and structural feature, resulting in current directly flowing from the negative terminal to the disclosed enclosure, i.e., by-passing jelly roll assemblies 72.

Using process 300, as discussed above, jelly roll assemblies 72 may be filled with electrolyte while positioned in support member 408, 508, prior to installation with can 402, 502. In doing so, it is important to ensure electrolyte is filled and retained within jelly roll assemblies 72. Spilling/overflowing of electrolyte onto the outer portion of jelly roll assemblies 72 and/or support member 408, 508 may cause safety and reliability concerns for jelly roll assemblies 72. Therefore, incorporating process 300 is important for both ensuring maximum electrolyte absorption and minimizing jelly roll assembly 72 failure.

Although the present disclosure has been described with reference to exemplary implementations, the present disclosure is not limited by or to such exemplary implementations. Rather, various modifications, refinements and/or alternative implementations may be adopted without departing from the spirit or scope of the present disclosure.

The invention claimed is:

1. A multi-core lithium ion battery, comprising:
   an enclosure including a base, and a plurality of sidewalls that define an internal volume;
   a support member positioned within the enclosure, wherein the support member defines a plurality of cavities;
   a cover relative to the enclosure in substantial alignment with the base so as to enclose the internal volume of the enclosure;
   a plurality of jelly roll assemblies disposed within a corresponding one of the plurality of cavities; and
   at least one positive bus bar defining a first plane and electrically connected to the plurality of jelly roll assemblies, the at least one positive bus bar including a positive connective structure mounted with respect to a connective region defined by the at least one positive bus bar;

at least one negative bus bar defining a second plane and electrically connected to the plurality of jelly roll assemblies, the at least one negative bus bar including a negative connective structure mounted with respect to a connective region defined by the at least one negative bus bar;

wherein the first plane and the second plane are in parallel spaced alignment; and wherein the positive connective structure and the negative connective structure are configured and dimensioned to mount with respect to the cover in a common plane.

2. The multi-core lithium ion battery of claim 1, wherein the at least one positive connective structure is fabricated from at least two stacked conductive materials.

3. The multi-core lithium ion battery of claim 1, wherein the at least one positive connective structure is fabricated from at least one braided material.

4. The multi-core lithium ion battery of claim 1, further comprising a blanket-like structure positioned relative to the plurality of jelly roll assemblies.

5. The multi-core lithium ion battery of claim 4, wherein the blanket-like structure is selected from a group consisting of alkaline earth silicate wool, basalt fiber, asbestos, volcanic glass fiber, fiberglass, cellular glass, and any combination thereof.

6. The multi-core lithium ion battery of claim 4, wherein the blanket-like structure further comprises a binding material, which is selected from a group consisting of nylon, PVC, PVA, acrylic polymers, and any combination thereof.

7. The multi-core lithium ion battery of claim 1, wherein the cover, the at least one positive connective structure, and the at least one negative connective structure are configured and dimensioned to rotate between a first position and a second position.

8. The multi-core lithium ion battery of claim 7, wherein the at least one positive connective structure moves with the cover such that the at least one positive connective structure does not impede the rotation of the cover from the first position to the second position.

9. The multi-core lithium ion battery of claim 1, wherein the at least one negative connective structure is fabricated from at least two stacked conductive materials.

10. The multi-core lithium ion battery of claim 1, wherein the at least one negative connective structure is fabricated from at least one braided material.

11. The multi-core lithium ion battery of claim 7, wherein the at least one negative connective structure moves with the cover such that the at least one negative connective structure does not impede the rotation of the cover from the first position to the second position.

* * * * *